United States Patent
Seal

(10) Patent No.: US 9,341,307 B2
(45) Date of Patent: May 17, 2016

(54) APPARATUS, SYSTEM, AND METHOD FOR DISPLAYING CONTENT ON A VEHICLE

(71) Applicant: Hitch Demon, LLC, Sandy, UT (US)

(72) Inventor: Trevor Seal, Sandy, UT (US)

(73) Assignee: Hitch Demon, LLC, Sandy, UT (US)

( * ) Notice: Subject to any disclaimer, the term of this patent is extended or adjusted under 35 U.S.C. 154(b) by 0 days.

(21) Appl. No.: 14/520,044

(22) Filed: Oct. 21, 2014

(65) Prior Publication Data

US 2015/0108299 A1  Apr. 23, 2015

Related U.S. Application Data

(60) Provisional application No. 61/893,756, filed on Oct. 21, 2013.

(51) Int. Cl.
| | |
|---|---|
| A47B 96/06 | (2006.01) |
| F16M 13/02 | (2006.01) |
| F16M 11/10 | (2006.01) |
| F16M 11/38 | (2006.01) |
| F16M 13/00 | (2006.01) |
| G03B 21/30 | (2006.01) |
| G03B 29/00 | (2006.01) |
| G09F 21/04 | (2006.01) |
| G09F 19/18 | (2006.01) |

(52) U.S. Cl.
CPC ............ *F16M 13/022* (2013.01); *F16M 11/10* (2013.01); *F16M 11/38* (2013.01); *F16M 13/00* (2013.01); *F16M 13/02* (2013.01); *G03B 21/30* (2013.01); *G03B 29/00* (2013.01); *G09F 19/18* (2013.01); *G09F 21/04* (2013.01); *G09F 21/048* (2013.01)

(58) Field of Classification Search
CPC ....... F16M 13/022; G03B 21/14; G03B 21/30
USPC ...................... 353/12–14; 701/201; 340/438; 248/205.1; 40/451; 280/186, 406.2
See application file for complete search history.

(56) References Cited

U.S. PATENT DOCUMENTS

| | | |
|---|---|---|
| 2,023,845 A | 12/1935 | Larose |
| 3,191,490 A | 6/1965 | Rabinow |
| 5,518,159 A | 5/1996 | DeGuevara |

(Continued)

FOREIGN PATENT DOCUMENTS

| | | |
|---|---|---|
| DE | 20212462 U1 | 11/2002 |
| DE | 10122977 A1 | 1/2003 |

(Continued)

OTHER PUBLICATIONS

PCT/US2013/028740 International Search Report and Written Opinion, Jun. 27, 2013.

*Primary Examiner* — Mark Wendell
(74) *Attorney, Agent, or Firm* — Kunzler Law Group

(57) ABSTRACT

Methods, systems, and apparatuses for displaying or projecting images on a vehicle are described herein. The system includes a mount bar for engaging a hitch receiver tube of a vehicle, and an intermediate arm having a first end rotationally coupled with the mount bar, where the first end is lockable in a position with respect to the mount bar. The system also includes a projector arm having a first end rotationally coupled with a second end of the intermediate arm, where the first end of the projector arm is lockable in a position with respect to the second end of the intermediate arm.

17 Claims, 26 Drawing Sheets

(56) References Cited

U.S. PATENT DOCUMENTS

| | | |
|---|---|---|
| 5,845,921 A | 12/1998 | Stimac |
| 6,079,136 A | 6/2000 | Kozlarek |
| 6,220,737 B1 | 4/2001 | Baragona |
| 6,489,934 B1 | 12/2002 | Klausner |
| 6,641,041 B2 | 11/2003 | Olds et al. |
| 6,655,822 B1 | 12/2003 | Sylvester |
| 6,685,347 B2 | 2/2004 | Grutze |
| 6,733,134 B2 | 5/2004 | Bleiner |
| 7,054,740 B2 | 5/2006 | Chinomi et al. |
| 7,154,383 B2 * | 12/2006 | Berquist ............ 340/425.5 |
| 7,175,321 B1 | 2/2007 | Lopez |
| 7,327,516 B2 | 2/2008 | Wheeler |
| 7,407,294 B2 | 8/2008 | Choi |
| 7,440,842 B1 | 10/2008 | Vorona |
| 7,470,030 B2 | 12/2008 | Devos et al. |
| 7,874,681 B2 | 1/2011 | Huebner |
| 7,901,083 B2 | 3/2011 | Destain et al. |
| 8,091,822 B2 | 1/2012 | Boyce |
| 8,606,430 B2 | 12/2013 | Seder et al. |
| 8,608,317 B2 | 12/2013 | Babst et al. |
| 8,651,664 B2 | 2/2014 | Harvey et al. |
| 8,733,939 B2 | 5/2014 | Othmer |
| 2001/0043313 A1 | 11/2001 | Okura |
| 2002/0180936 A1 | 12/2002 | Muehlhoff et al. |
| 2003/0024195 A1 | 2/2003 | Koh et al. |
| 2003/0099104 A1 | 5/2003 | Hou |
| 2003/0193651 A1 | 10/2003 | Egle |
| 2004/0059498 A1 | 3/2004 | Chinomi et al. |
| 2005/0041212 A1 | 2/2005 | Weidow, III |
| 2006/0143957 A1 | 7/2006 | Salehi |
| 2006/0191180 A1 | 8/2006 | Williams et al. |
| 2006/0268233 A1 | 11/2006 | Sato |
| 2007/0153375 A1 | 7/2007 | Peterson et al. |
| 2007/0216136 A1 | 9/2007 | Dietz |
| 2007/0242471 A1 | 10/2007 | Campbell et al. |
| 2008/0258938 A1 | 10/2008 | Moon |
| 2008/0284983 A1 * | 11/2008 | Dula ............ 352/131 |
| 2008/0305283 A1 | 12/2008 | Denet |
| 2009/0015798 A1 | 1/2009 | Unsworth |
| 2009/0284960 A1 | 11/2009 | Chien |
| 2010/0036717 A1 | 2/2010 | Trest |
| 2010/0141902 A1 | 6/2010 | Destain et al. |
| 2010/0188204 A1 | 7/2010 | Okada et al. |
| 2010/0253918 A1 | 10/2010 | Seder et al. |
| 2011/0029232 A1 | 2/2011 | Hattori et al. |
| 2011/0032484 A1 * | 2/2011 | Seal ............ 353/13 |
| 2011/0089297 A1 | 4/2011 | Bishop |
| 2011/0188257 A1 | 8/2011 | Sidler |
| 2012/0212712 A1 | 8/2012 | Scanlon |
| 2013/0006775 A1 | 1/2013 | Jordan et al. |
| 2013/0147840 A1 | 6/2013 | Seder et al. |
| 2013/0238409 A1 | 9/2013 | Chatterjee et al. |

FOREIGN PATENT DOCUMENTS

| | | |
|---|---|---|
| EP | 2133857 A1 | 12/2009 |
| JP | 2005156269 | 6/2005 |
| JP | 2009058799 | 3/2009 |
| WO | 01/45065 A2 | 6/2001 |
| WO | 2004/070690 A1 | 8/2004 |
| WO | 2008091201 A1 | 7/2008 |
| WO | 2014086992 A1 | 6/2014 |

* cited by examiner

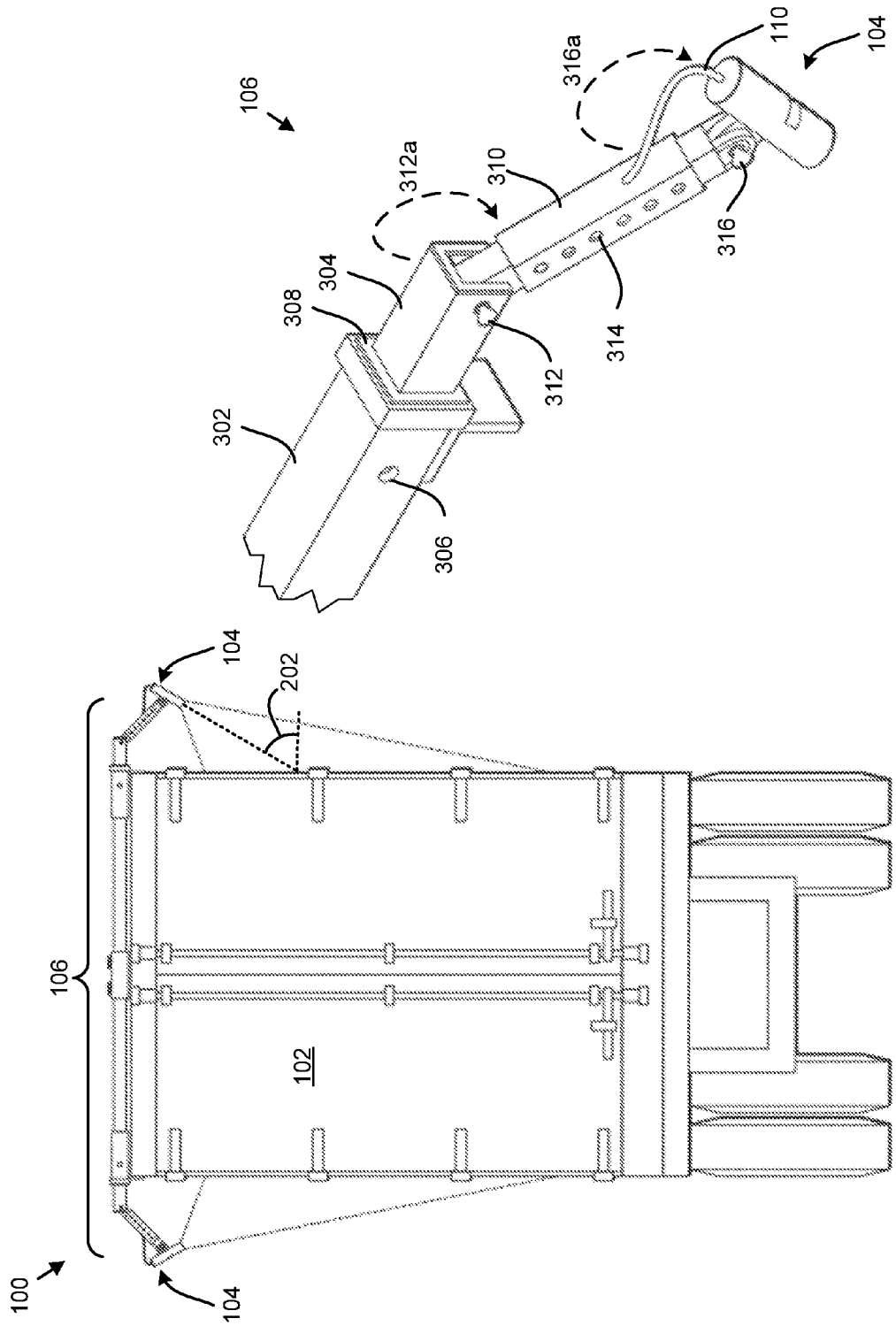

APPARATUS, SYSTEM, AND METHOD FOR DISPLAYING CONTENT ON A VEHICLE

CROSS-REFERENCES TO RELATED APPLICATIONS

This application claims the benefit of and claims priority to U.S. Provisional Patent Application No. 61/893,756 entitled "APPARATUS, SYSTEM, AND METHOD FOR DISPLAYING CONTENT ON A VEHICLE" and filed on Oct. 21, 2013 for Trevor Seal, which is incorporated herein by reference.

FIELD

This disclosure relates to customizing the appearance of a vehicle and more particularly relates to displaying content on a vehicle.

BACKGROUND

Vehicle manufacturers are constantly in search of mechanisms, methods and styles which customize their vehicles and create unique vehicle designs. Vehicle owners also customize their vehicles to present an image or idea that they find important. Also, companies and small business owners oftentimes look to customize a vehicle as an advertising or promotional tool. Often this is done by painting the vehicle, affixing a large sticker to the vehicle, or purchasing a unique vehicle. These forms of customization and advertising are expensive and time consuming. They are also permanent, or at least require a great deal of work to change.

SUMMARY

An apparatus for displaying content on a vehicle is disclosed. In one embodiment, the apparatus includes a mount bar for engaging a hitch receiver tube of a vehicle, and an intermediate arm having a first end rotationally coupled with the mount bar, where the first end is lockable in a position with respect to the mount bar. The apparatus may also include a projector arm having a first end rotationally coupled with a second end of the intermediate arm, where the first end of the projector arm is lockable in a position with respect to the second end of the intermediate arm.

In one embodiment, the apparatus also includes a gear disposed between the first end of the intermediate arm and the mount bar, the gear rotationally coupled with one of the mount bar or the intermediate arm, and a locking arm comprising teeth configured for engaging the gear and locking the position of the intermediate arm with respect to the mount bar. In another embodiment, the apparatus includes a gear disposed between the second end of the intermediate arm and the projector arm, the gear rotationally coupled with one of the second end of the intermediate arm or the projector arm, and a locking arm comprising teeth configured for engaging the gear and locking the position of the projector arm with respect to the second end of the intermediate arm.

In one embodiment, the projector arm comprises a second end configured for engaging protrusions of the projector to couple the projector to the second end of the projector arm. In a further embodiment, the apparatus includes a compressible collar disposed between the mount bar and the hitch receiver tube. Additionally, the intermediate arm and the projector arm together may form a conduit for an electrical connection between the projector and the vehicle.

In one embodiment, the intermediate arm has a length greater than the projector arm. The projector arm is transitionable between a plurality of lockable positions that include an open position and a closed position, and the projector arm collapses and engages the intermediate arm when in the closed position.

The disclosure also includes a device for displaying content on a vehicle. In one embodiment, the device includes a mount bar for engaging a hitch receiver tube of a vehicle, and a flexible arm coupled at a first end with the mount bar and extending outward from the mount bar. The device may also include a projector mounting bracket coupled to a second end of the flexible arm, the projector mounting bracket configured to support a projector.

In one embodiment, the device includes a compressible collar disposed between the mount bar and the hitch receiver tube. The flexible arm may comprise gooseneck tubing with a length in the range of between about 12 and 24 inches, and a diameter in the range of between about ¼ and 3 inches.

The disclosure also includes a system. The system may include a mount bar for engaging a hitch receiver tube of a vehicle, an intermediate arm having a first end rotationally coupled with the mount bar, where the first end is lockable in a position with respect to the mount bar, and a projector arm having a first end rotationally coupled with a second end of the intermediate arm, where the first end of the projector arm is lockable in a position with respect to the second end of the intermediate arm. At least one of the intermediate arm or the projector arm is telescoping.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 2 is a rear view diagram illustrating one embodiment of the vehicle display system in accordance with embodiments of the disclosure;

FIG. 3 is a perspective view diagram of one embodiment of a mounting mechanism in accordance with one embodiment of the disclosure;

DETAILED DESCRIPTION

Figure 1:
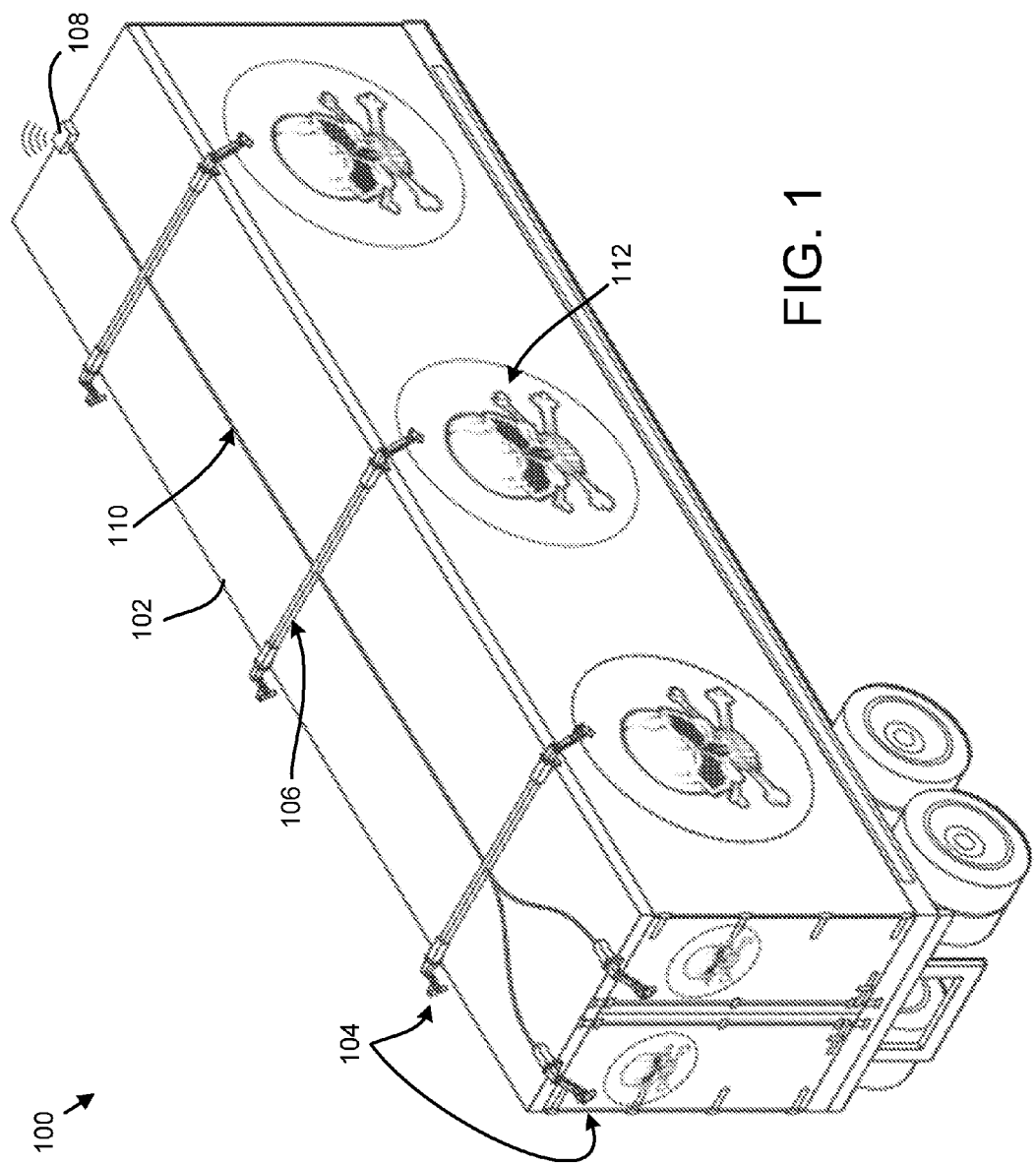
FIG. 1 is a perspective view depicting one embodiment of a vehicle display system in accordance with embodiments of the disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1 is a perspective view depicting one embodiment of a vehicle display system 100 in accordance with embodiments of the disclosure. The vehicle display system 100 includes a vehicle 102, one or more projectors 104, one or more mounting mechanisms 106, and a control module 108.

In the depicted embodiment, the vehicle 102 is a semi-trailer configured to be pulled by a truck. The semi-trailer includes an interior where goods may be placed for transportation within the semi-trailer. According to one embodiment, the vehicle 102 may be an unpowered vehicle such as a trailer, cart, or the like. For example, the vehicle 102 may include a street legal vehicle that is configured to be pulled by a powered vehicle. According to another embodiment, the vehicle 102 may be a powered vehicle such as a tractor truck, box truck, van, or any other powered vehicle. For example the vehicle 102 may include a gasoline, diesel, or electric motor, or the like. According to one embodiment, the vehicle 102 may include a trailer and a truck.

The projectors 104 may be devices which cast light to form an image. For example, the projectors 104 may be configured to cast light against a surface of the vehicle 102 to form one or more images 112. In one embodiment, the projectors 104 include projectors which are capable of quickly switching from one image to the next. For example, the projectors 104 may include digital video projectors which can receive data or a signal corresponding to an image, series, of images, and/or a video and cast light to visually display the received data or signal.

In one embodiment, the projectors 104 are mounted to the vehicle 102 via mounting mechanisms 106. The projectors 104 may be mounted on the vehicle such that an image created by the projector is cast on a surface of the vehicle. The mounting mechanisms 106 may be configured to engage the vehicle 102 and the projectors 104 such that the projectors are held substantially stationary with respect to the vehicle 102. In the depicted embodiment, the mounting mechanisms 106 engage an external surface of the vehicle 102 and hold the projectors 104 external to the vehicle 102. According to one embodiment, the projectors 104 are mounted such that they cast light against an outside surface of the vehicle. For example, in one embodiment, light from the projector encounters an exterior surface of the vehicle 102 from a direction external to the vehicle.

The projectors 104 may include any type of display elements for image projection known in the art. Exemplary projectors 104 may include cathode ray tube (CRT) projectors, liquid crystal display (LCD) projectors, digital light processing (DLP) projectors, any variations on these projector types, or the like. According to one embodiment, any type of digital, analog, or other projection system for displaying images may be used. In some embodiments, projectors 104 are configured to cast light on a surface that is a relatively large distance from the projector with the surface being substantially perpendicular to the direction in which the light is cast. In one embodiment, the projectors 104 are specifically configured to create images on a nearby surface and/or on surfaces that are substantially non-perpendicular to the projectors. For example, close throw projectors may be used or projectors with lenses designed to compensate for resulting skew of images may be used.

FIG. 2 is a rear view diagram illustrating one embodiment of the vehicle display system 100 in accordance with embodiments of the disclosure. FIG. 2 also depicts exemplary projectors 104 and an exemplary mounting mechanism. Please note that the rear projectors 104 shown in FIG. 1 are not shown for clarity. The projectors 104 are shown supported by a mounting mechanism 106. In the depicted embodiment, the mounting mechanism 106 is attached to the top of the vehicle 102 and projectors 104 are adjustably mounted to the mounting mechanism 106. FIG. 2 further illustrates an exemplary angle 202 between the projector and the surface of the vehicle 102. In one embodiment, the angle 202 may require significant image correction for proper appearance on the side of the vehicle 102.

FIG. 3 is a perspective view diagram of one embodiment of a mounting mechanism 106 in accordance with one embodiment of the disclosure. The exemplary mounting mechanism 106 includes a mounting tube 302, an insert 304, and an adjustable arm 310. The mounting tube 302 may be an elongated tube that can be secured to a vehicle 102. For example, the mounting tube 302 is depicted secured to the top of the vehicle 102 in FIG. 2. The mounting tube 302 and/or other portions of the mounting mechanism 106 may be formed of a variety of materials. In one embodiment, the mounting tube 302 and/or other portions of the mounting mechanism 106 are made of a structurally strong material such as a metal, plastic, fiberglass, or the like. According to one embodiment, the mounting tube 302 must be strong enough to securely hold other portions of the mounting mechanism 106 and a projectors against forces such as environmental wind, wind from movement of the vehicle 102, brushing up against other objects such as tree branches, or the like.

The insert 304 is depicted inserted within the mounting tube 302. The insert 304 may be held within mounting tube 302 using a pin or bolt inserted through a mounting tube hole 306. In one embodiment, a fitting 308 may be used to adapt the insert 304 to the size of the mounting tube 302 and/or dampen vibrations. Secure and tight fitting between the insert and mounting tube 302 and/or reduced vibrations may extend the useable life of the mounting mechanism 106 and/or projector 104. The adjustable arm 310 may be attached to the insert 304 via an arm fastener 312. In one embodiment, the arm fastener 312 may be selectively tightened or loosened to adjust an angle between the insert 304 and the adjustable arm 310. Rotation of the adjustable arm 310 with respect to the insert 304 as allowed by the arm fasten 312 is depicted by arrow 312a. The adjustable arm 310 may be adjustable in length using a pin or other mechanism within holes 314 to selectively secure the length of the adjustable arm 310 at a desired length.

In one embodiment, the projectors 104 may be attached to the adjustable arm 310 via a projector fastener 316. The projector fastener 316 may be may be selectively tightened or loosened to adjust an angle between the projector 104 and the adjustable arm 310. Rotation of the adjustable arm 310 with respect to the projector 104 as allowed by the projector fastener 316 is depicted by arrow 316a. In one embodiment, the mounting tube 302 and adjustable arm 310 may be hollow such that a communication line 110, power cord, or other line may be run through mounting mechanism 106 to provide power and/or communication to the projectors 104.

In one embodiment, the adjustable arm 310, arm fastener 312, and projector fastener 316 allow for substantial adjustment and customization for mounting to a desired vehicle. According to one embodiment, the mounting mechanism 106 and projectors 104 may be configured for attachment to a large number of different types of vehicles 102. For example, the mounting mechanism 106 may be configured for substantially universal mounting of projectors 104 to a variety of vehicle types such as box trucks, semi-trailers, and others. The adjustable nature of the mounting mechanism 106 may allow for the vehicle display system 100 to be used on a variety of vehicle or in a variety of different manners or configurations.

According to one embodiment, external mounting of the mounting mechanism 106 and/or projectors 104 may allow for substantially normal utilization of a vehicle 102. For example, if a vehicle 102 is designed for transportation of goods or individuals, an interior of the vehicle may be unaltered or occupied. Thus, goods or individuals may be transportable as if no vehicle display system 100 were being used. Additionally, mounting of the projectors 104 such that projected light encounters the vehicle 102 from an external direction may allow for the vehicle display system 100 to be used on already existing vehicle. According to one embodiment, no special screens may be required. In other embodiments, specialized configuration of a surface of the vehicle 102 may be performed to optimize the appearance of projected images. For example, cloth, selectively reflective material or screens may be used in some embodiments. Variations on display screens for optimized appearance of projected images is known in the art and any such variations or finishes may be applied to one or more locations on a vehicle to optimize appearance of projected images.

The elements and configuration of the mounting mechanism 106 are exemplary only. One of skill in the art will recognize the considerable variation possible in relation to mounting the projector 104 to a vehicle 102 to display images thereon.

Returning to FIG. 1, the vehicle display system 100 may include a control module 108. In one embodiment, the control module 108 is configured to provide images to the projectors 104 for display on a side of the vehicle 102. In one embodiment, a communication line 110 or other line may electrically connect the control module 108 to the projectors 104. In other embodiments, the control module 108 may communicate wirelessly with the projectors 104. In yet other embodiments, each projector 104 may have an integrated control module 108 disposed within a projector housing. According to one embodiment, the projectors 104 may be powered through the communication line 110 or some other wire or cable. According to one embodiment, the projectors and/or control module 104 may be powered by a trailer hookup, generator, or the like.

According to the depicted embodiment, the control module 108 has provided a signal or data corresponding to an image 112 of a skull to the projectors 104, which in turn are depicted displaying the image 112 on the sides and back of the vehicle 102. According to one embodiment, the control module 108 is capable of providing virtually any type of visual data to the projectors 104 for display on the vehicle. For example, a driver, passenger, or other individual with either physical or communication access to the control module 108 may change the visual content displayed. This may allow for almost immediate modification of the appearance of the vehicle 102.

Figure 4:
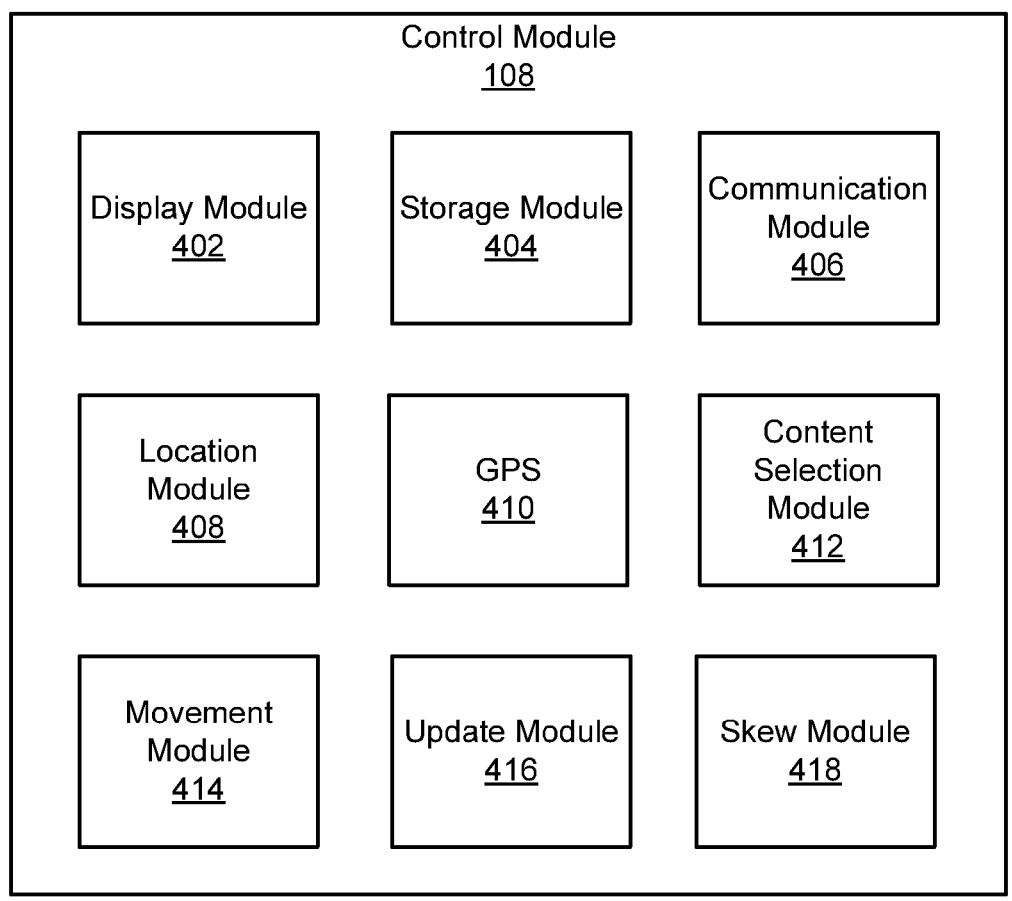
FIG. 4 is a schematic block diagram illustrating one embodiment of a control module in accordance with embodiments of the disclosure.

FIG. 4 is a schematic block diagram illustrating one embodiment of a control module 108 in accordance with embodiments of the disclosure. The depicted control module 108 includes a display module 402, a storage module 404, a communication module 406, a location module 408, a GPS 410, a content selection module 412, a movement module 414, an update module 416, and a skew module 418. It is important to note that not all modules 402-418 may be included in all embodiments. Varying embodiments may include only one or any combination of any two or more of the modules 402-418.

The control module 108 may include a display module 402 that provides images for display by the projectors 104. In one embodiment, the display module 402 may provide the images in the form of a signal or data that corresponds to images. For example, the display module 402 may include a processor, video card, or other device that generates a signal for transmission to the projectors. The display module 402 may send a signal or data using a network card or other communication device to the projectors 104. In one embodiment, the signal or data may be sent over a wired connection such as over the communication line 110. In one embodiment, the display module 402 may provide the signal or data wirelessly to the projectors 104.

In one embodiment, the display module 402 may provide any type of visual content to the projectors 104. In one embodiment, the display module 402 may be configured to provide one or more of still images, video, or other content. In one embodiment, the display module 402 may be capable of providing a different signal or different content to different projectors at substantially the same time. For example, if a vehicle display system 100 includes two or more projectors 104 the display module 402 may be configurable to display a different image on each of the projectors. According to one embodiment, the display module 402 may be configurable to display the same image on two or more projectors.

The control module 108 may include a storage module 404 for accessing display content data on a storage device. In one embodiment, the storage module 404 may include circuitry or a port for connecting to a storage device. According to one embodiment, the storage module 404 may be configured to access a storage device that is part of the control module 108. In one embodiment, the storage module 404 allows for the content available for display by the display module 420 to be changed. For example, the storage module 404 may allow a user to insert a jump drive or other memory device to provide content for display. In one embodiment, the storage module 404 may allow for some content to be stored on the control module 108.

The control module 108 may include a communication module 406 for communicating with another device. According to one embodiment, the communication module 406 allows for wired or wireless communication using one or more protocols. For example, the communication module 406 may be configured for communication using a wireless data network standard, a wireless computer network standard, Bluetooth®, or any other wireless communication standard. In one embodiment, the communication module 406 may be configured to communicate with a portable computing device, such as a smart phone. In one embodiment, the communication module 406 may allow for wireless control of the control module 108 and/or the attached projectors 104. For example, a user with an application running on a smart phone may be able to communicate with the control module 108 and control the content displayed on the projectors 104.

The control module 108 may include a location module 408 that determines a current location of a vehicle 102. In one embodiment, the location module 408 may determine a current location of the vehicle 102 to which the vehicle display system 100 is mounted. In one embodiment, the location module 408 may determine the location of the vehicle 102 based on a signal from a global position system (GPS) enabled device. In one embodiment, the control module 108 may include a GPS 410. Thus, if the control module 108 is located with the vehicle 102, the GPS 410 may be able to determine the location based on a GPS signal and provide the location to the location module 408. In one embodiment, an external GPS 410 that is part of another device or system may be able to communicate with the control module 108 to provide location data.

The control module 108 may include a content selection module 412. The content selection module 412 may select content that corresponds to the current location of the vehicle display system 100 for display on the projectors 104. According to one embodiment, the content accessible to the control module 108, for example, by the storage module 404, may include desired location data to indicate locations at which the content should be displayed. The content selection module 412 may, using the desired location data select content that best corresponds to a certain location. The selected content may then be provided to the display module 402, for example, for display on the projectors 104. In one embodiment, the content selection module 412 may select content according to a variety of rules such that content is displayed at a proper time and/or location and according to a proper frequency. Additional rules may be based on a state or type of vehicle 102, input from a user in the vehicle, input from a remote user or device, or any other data. For example, the content selection module 412 may receive input from any of the other modules 402-410 or 416 which affects what content will be selected.

In one embodiment, the content for display that is accessible to the control module 108 may include advertising data. The advertising data may include, among other things, images, video, location, or other advertising data that may be displayed by projectors 104. For example, as a vehicle 102 traveling on a freeway having a vehicle display system 100 is approaching a certain exit, the content selection module 412 may select advertising content that corresponds to goods or services offered at a location accessible at the exit. This selected content may then be displayed on the vehicle 102 using the projectors 104 such that cars or individuals located nearby may see the advertisement. This may help drive customers, tourists, or others to the offeror of the goods or services.

According to one embodiment, the content for selection, the location of the vehicle 102, and/or other data may be logged by the control module 108 or may be communicated using the communication module 406 for tracking of what advertisements have been used, where, etc.

The control module 108 may include a movement module 414 that determines whether the vehicle 102 is moving. For example, the control module 108 may detect movement based on locations determined by the location module 408 over time. In one embodiment, the movement module 414 may detect a varying location based on GPS or any other type of sensor or input and determine that the vehicle 102 is moving. According to one embodiment, a determination that the vehicle 102 is moving may affect what content is selected for display by the content selection module 412. For example, traffic laws or other laws may control what type of content can be displayed on a moving vehicle or near moving vehicles. According to one embodiment, only content that meets the requirements of the laws will be selected.

According to one exemplary scenario, it may be illegal to distracting images, video, or other types of content on a moving vehicle. According to such a scenario, the movement module 414 may restrict the display of any content that includes distracting images, video, or other prohibited content in response to determining that the vehicle 102 is moving. For example, when moving down a road only still images (i.e., static images) or images that change infrequently, are displayed by the projectors. Alternatively, if the vehicle 102 is not moving there may be perhaps no restrictions on the content that can be displayed.

The control module 108 may include an update module 416 for updating the control module 108. According to one embodiment, the update module 416 may be configured to download and/or install updates to code, content, or any other aspect of the control module 108.

The control module 108 may include a skew module 418 that adjusts an image to compensate for distortion resulting from an angle of projection. For example, FIG. 2 illustrates an exemplary angle 202 between the projectors 104 and a surface of the vehicle 102. In one embodiment, angles other than substantially perpendicular angles with respect to a surface of the vehicle can lead to vertically skewed, horizontally skewed, or otherwise distorted images. In one embodiment, the skew module 418 may adjust the image such that angle is compensated for and the image does not appear distorted on the vehicle 102 surface.

In one embodiment, compensation for the angle may be done through processing, such as calculating the effect of an angle and adjusting the image digitally to create a skewed image that, when projected, appears undistorted. For example, an image may be digitally "keystoned" such that it appears non-keystoned or undistorted when projected against the vehicle 102. In another embodiment, a lens or other device may be used on the projector itself to compensate for any non-perpendicular projection angle. According to one embodiment, the skew module 418 or a lens may also compensate for varying brightness between portions of the image based on the projection angle. According to one embodiment, compensation for display angles may be built into the projectors 104 themselves. For example, a lens or a skew module 418 may be included within each projector 104.

In one embodiment, not all modules 402-418 may be located within the same device. For example, the control module 108 may include one or more devices. According to one embodiment, some modules may be included in a control module while other modules may be included in software running on a separate device. For example, a device in communication with the control module 108 or the vehicle display system 100 may include some modules that communicate with the control module 108 or other components of the vehicle display system 100. In one exemplary embodiment, the display module 402 and communication module 406 may be located within a control module 108 mounted on a vehicle while one or more of the other modules 404, 408-418 may be located within software running on a phone, remote server or computer, or other device.

In one embodiment, the control module 108 may be configured to execute on a smart phone, laptop computer, tablet, pad computer, desktop computer, or any other computer device running software the corresponds to one or more of the modules 402-418. In one embodiment, a smart phone may run an app that communicates with a vehicle display system 100 to control one or more aspects of its operation. For example, a control module 108 that includes one or more of the modules 402-418 may be mounted on a vehicle 102 while multiple different individuals may have their own phones that have software implementing the functions of one or more of the modules 402-418. In one embodiment, drivers, passengers, or other individuals may be able to transfer vehicles 102 and still be able control the display of content on the projectors 104 without transferring or changing possession of a device.

Figure 5A:
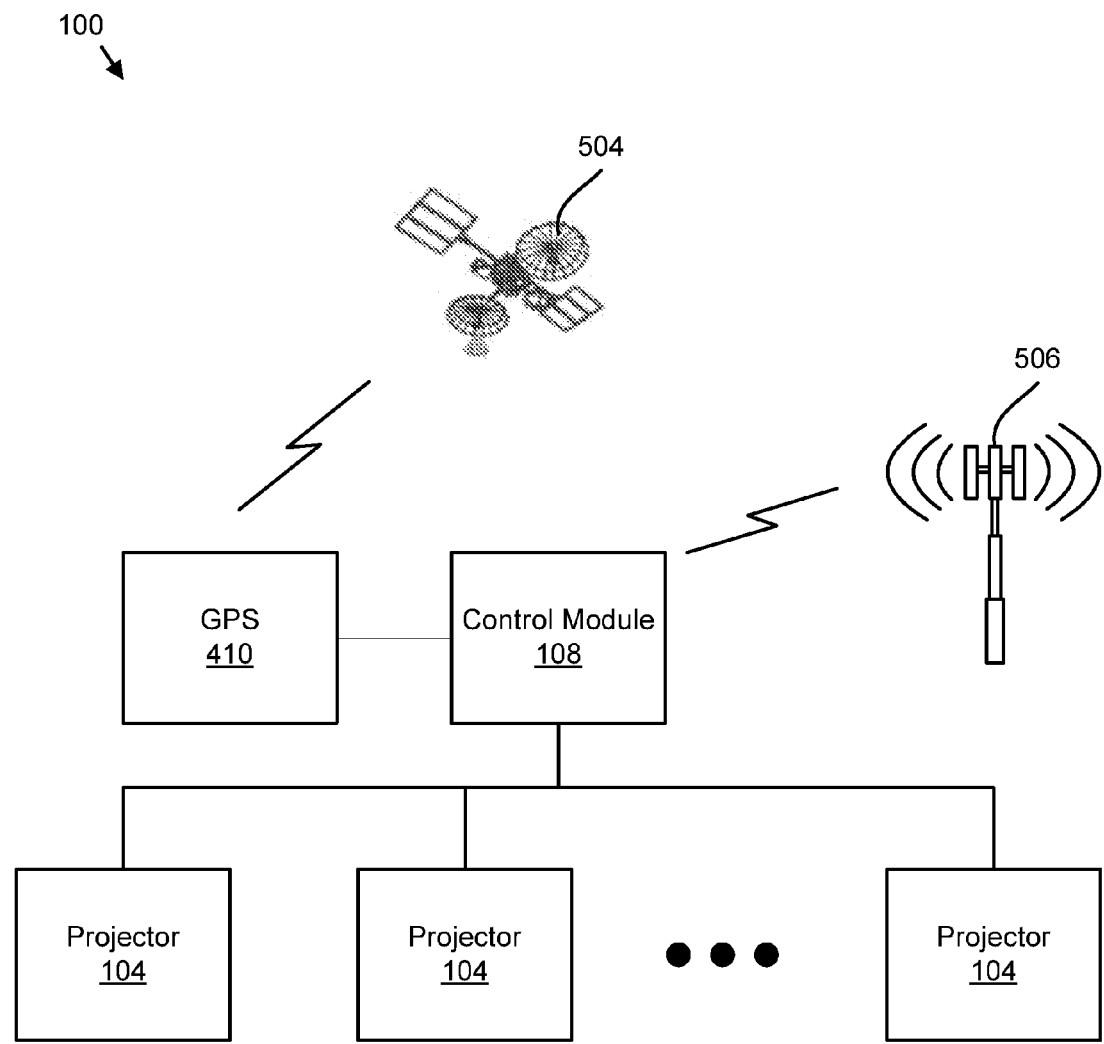
FIG. 5A is a schematic diagram illustrating one embodiment of an exemplary interconnection of components in accordance with embodiments of the disclosure.

FIG. 5A is a schematic diagram illustrating one embodiment of an exemplary interconnection of components in accordance with embodiments of the disclosure. The vehicle display system 100 includes a control module a plurality of projectors 104 and a GPS 410. The GPS 410 receives GPS signals from satellites 504 and provide location data to the control module 108. The control module communicates with an antenna 506. The antenna 506 may be connected to a wireless data network. The control module 108 communicates with projectors 104 to control display of images on a surface of a vehicle 102. Location data, in one embodiment may be provided via the wireless data network.

Figure 5B:
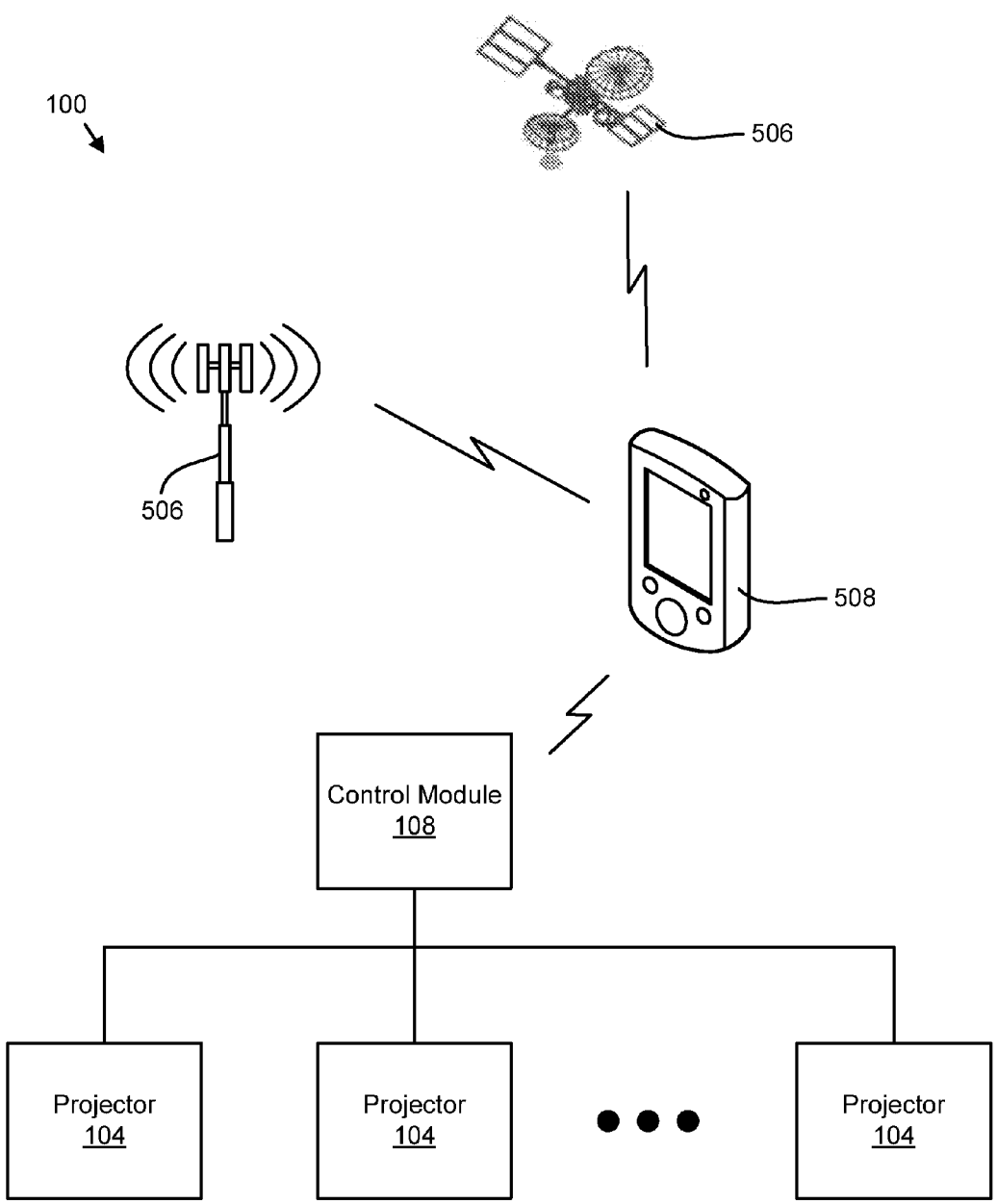
FIG. 5B is a schematic diagram illustrating another embodiment of an exemplary interconnection and/or communication between components in accordance with embodiments of the disclosure.

FIG. 5B is a schematic diagram illustrating another embodiment of an exemplary interconnection and/or communication between components in accordance with embodiments of the disclosure. The vehicle display system 100 includes a control module and a plurality of projectors 104. The control module 108 is in wireless communication with a smart phone 508. Although a smart phone 508 is depicted and described, it is contemplated that any network- or wireless-capable device may be substituted in place of the smart phone 508. The smart phone 508 is in communication with GPS satellites 504 and a wireless data network through an antenna 506. The smart phone 508 may provide options to a user to control the control module 108. The control module 108 is in communication with the projectors 104 to display selected content.

These options to control the control module 108 include the ability to select images and movies to be displayed by the projector. Examples include projecting photos stored on the smart phone 508 and/or selecting photos and videos from the Internet to be displayed by the projector. The smart phone 508 may also be configured to edit the photos for the projector. In a further embodiment, the smart phone 508 is configured to control the control module 108 to display a slide show of photos on the projector. Other options that may be available through the smart phone 508 include the ability to control any option of the projector including, but not limited to, skew, brightness, contrast, etc.

Figure 6:
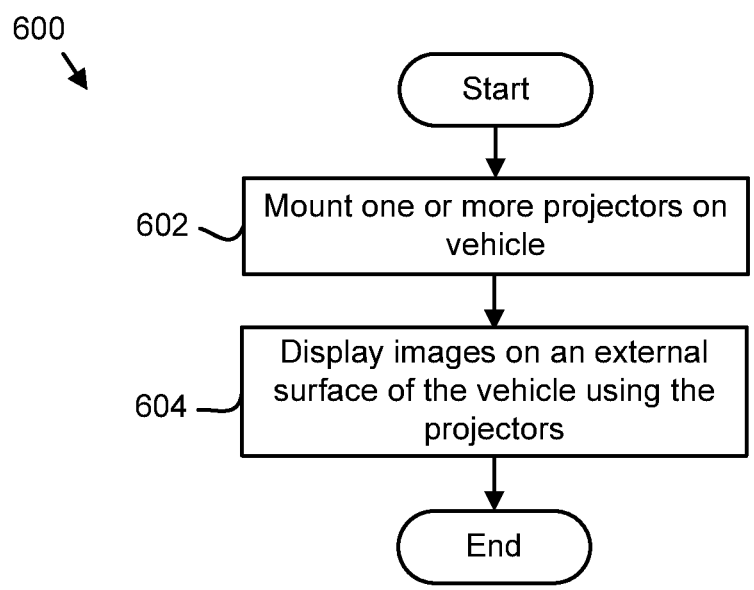
FIG. 6 is a schematic flow chart diagram illustrating one embodiment of a method for displaying content on a vehicle in accordance with embodiments of the disclosure.

FIG. 6 is a schematic flow chart diagram illustrating one embodiment of a method 600 for displaying content on a vehicle 102 in accordance with embodiments of the disclosure. According to one embodiment, the method may be used with a vehicle display system 100.

The method 600 starts and one or more projectors 104 are mounted 602 on a vehicle. The projectors 104 may be mounted using one or more mounting mechanisms 106. The projectors 104 may be mounted such that light from the projectors 104 encounters an external surface of the vehicle 102 from a direction external to the vehicle. The vehicle 102 may have a finish configured to optimize appearance of a projected image. In one embodiment, the vehicle 102 may have a conventional color or finish.

Images are displayed 604 on an external surface of the vehicle 102 using the projectors 104. The images may be part of any type of visual content including still image, text, video content, or any other visual content.

Figure 7:
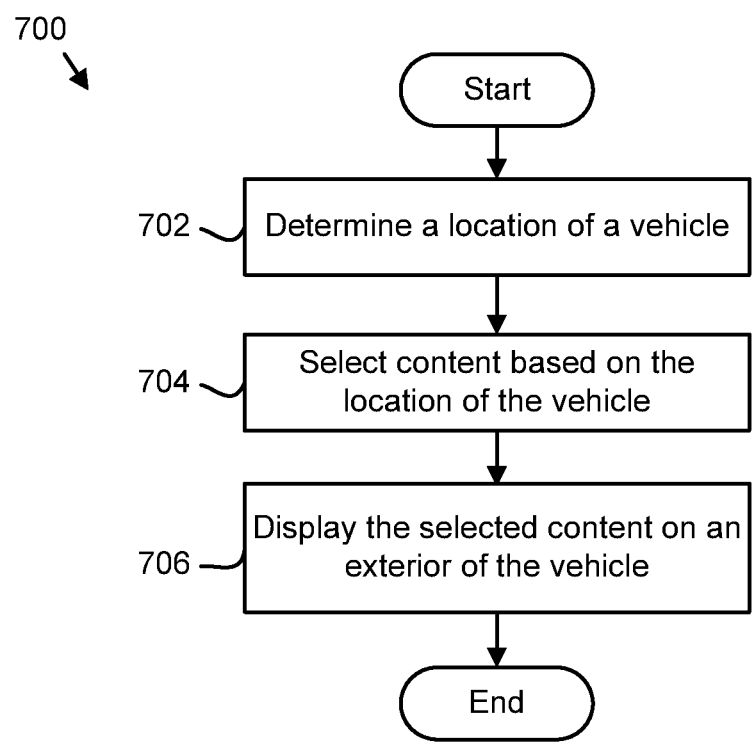
FIG. 7 is a schematic flow chart diagram illustrating one embodiment of a method 700 for displaying content vehicle based on a location of a vehicle in accordance with embodiments of the disclosure.

FIG. 7 is a schematic flow chart diagram illustrating one embodiment of a method 700 for displaying content vehicle 102 based on a location of a vehicle in accordance with embodiments of the disclosure. In one embodiment, the method 700 is performed by a vehicle display system 100.

The method begins and a location module 408 determines 702 a location of a vehicle 102. The location module 408 may determine 702 the location of the vehicle 102 based on any type of input device known in the art. In one embodiment, the location of the vehicle 102 is determined 702 based on a GPS signal from a plurality of satellites.

A content selection module 412 selects 704 content based on the location of the vehicle 102. The content may include location information or other information that the content selection module 412 uses to select 704 content for display. In one embodiment, the content for display includes advertising content.

One or more projectors 104 and/or a display module 402 display 706 the selected content on the vehicle 102. The content may be displayed on an external surface of the vehicle 102 for observation by nearby individuals. For example, individuals or cars or on the street near the vehicle 102 may be able to observe the displayed 706 content. In one embodiment, the content is displayed using a projector 104 mounted on the vehicle.

Figure 8:
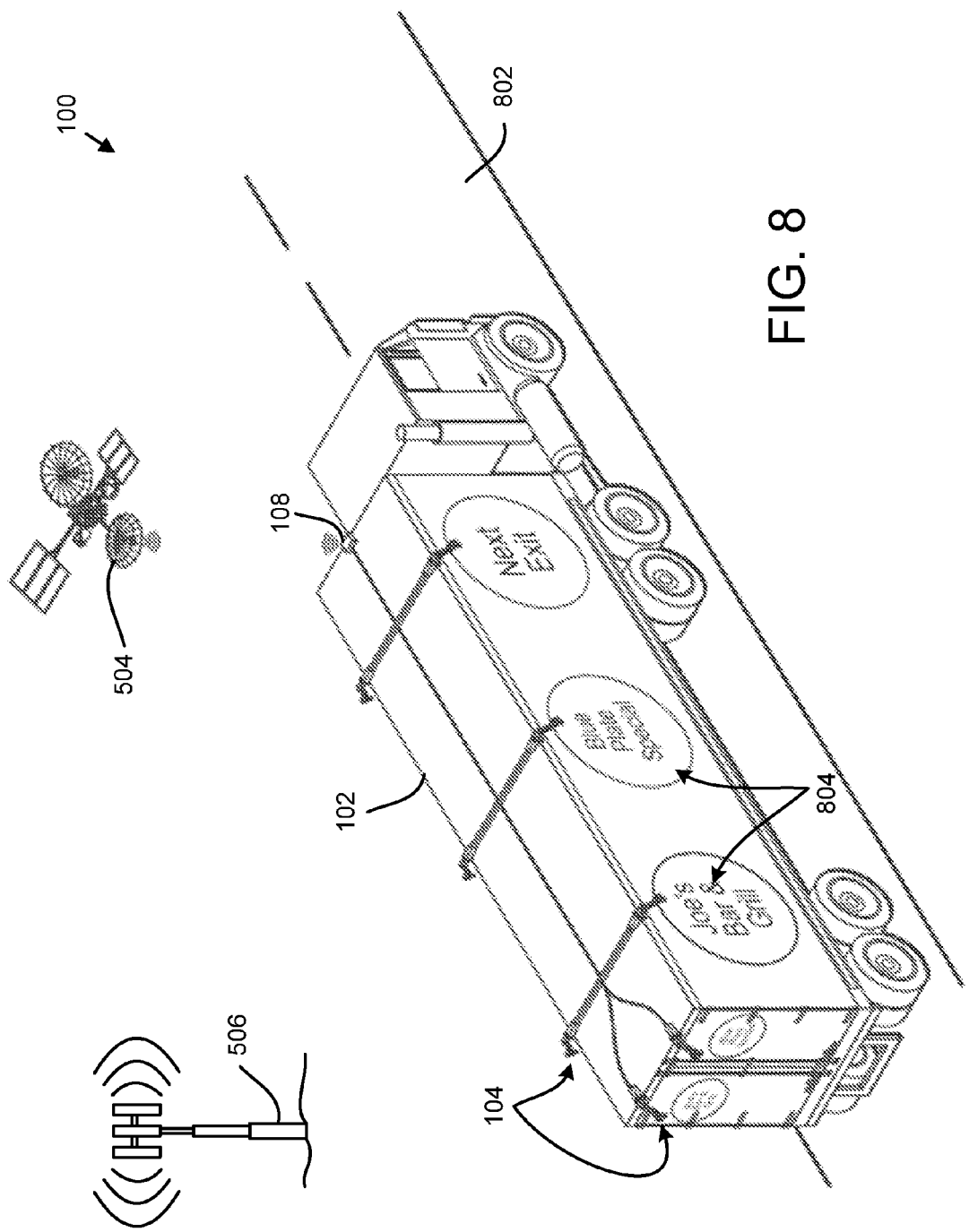
FIG. 8 is perspective view diagram illustrating one embodiment of a vehicle display system displaying location based content in accordance with embodiments of the disclosure.

FIG. 8 is perspective view diagram illustrating one embodiment of a vehicle display system 100 displaying location based content in accordance with embodiments of the disclosure. The vehicle 102 is shown driving down a road 802. The vehicle 102 has projectors 104 and a control module 108 mounted on top of the vehicle 102. The control module 108 receives a GPS signal from satellites 504 and determines a current location. The control module 108 may also communicate with an antenna 506 for a data network. The control module 108 provides location based content to the projectors 104 which then display the location based content. The projectors 104 are depicted displaying images 804 that advertise for Joe's Bar & Grill at the next exit as well as a special that is available. The control module 108 may receive the location based content from the antenna 506 for the data network.

Figure 9:
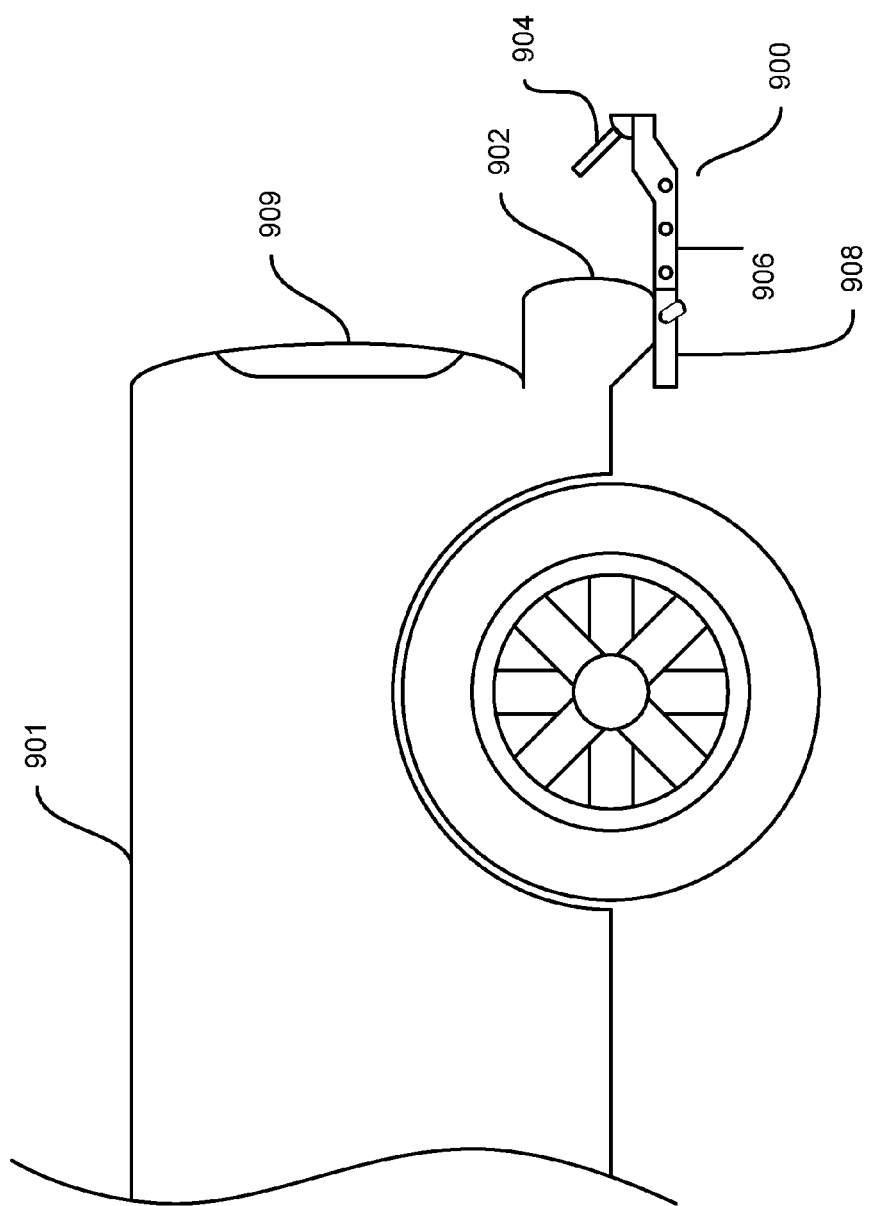
FIG. 9 depicts one embodiment of a vehicle mounted display device used to display images on an exterior surface of a vehicle in accordance with embodiments of the disclosure.

FIG. 9 depicts one embodiment of a vehicle mounted display device 900 (i.e., the projector) used to display images on an exterior surface of a vehicle 901 in accordance with embodiments of the disclosure. FIG. 9 shows the vehicle mounted display device 900 while it is attached to a rear portion 902 of a vehicle 901. The vehicle mounted display device 900 contains a projector 904, an image cartridge 1030 (not shown) and an adjustable mounting unit 906. In one embodiment, the adjustable mounting unit 906 contains a connector arm 1014, an intermediate arm 1012 and a projector arm 1010 (see FIG. 10). In one embodiment, the projector 904 shines an image onto an external surface of a vehicle 901. The position of the projector 904 can be adjusted by moving the adjustable mounting unit 906. The adjustable mounting unit 906 removably secures to the vehicle 901 so that the projector 904 can shine an image onto an external surface of the vehicle 901 while the vehicle 901 is in motion.

The adjustable mounting unit 906 is configured to attach to various types of vehicles 901 and trailer hitch receivers 908. In one embodiment, the adjustable mounting unit 906 is configured to attach to a typical trailer hitch receiver 908, as shown in FIG. 9. In most vehicles 901 which contain a trailer hitch receiver 908, the trailer hitch receiver 908 is mounted to the frame or chassis of the vehicle 901 and contains a rearward facing opening (not shown). The rearward facing opening is typically in the shape of a square and is configured to accept removable ball mounts, hitch bike racks, cargo carriers, and other accessories.

In the embodiment of FIG. 9, the vehicle mounted display device 900 attaches to the rear portion of a vehicle 901 by connecting the adjustable mounting unit 906 to the vehicle's trailer hitch receiver 908. In the embodiment of FIG. 9, the vehicle mounted display device 900 is attached to a trailer hitch receiver 908 which is located under the rear bumper of a vehicle 901.

As mentioned above, in one embodiment, the adjustable mounting unit 906 connects the projector 904 to the vehicle 901. The adjustable mounting unit 906 can be configured in many ways to achieve this objective. The adjustable mounting unit 906 may contain three arms: the projector arm 1010, the intermediate arm 1012 and the connector arm 1014 (see FIG. 10). The intermediate arm 1012 is located between, and connects, the projector arm 1010 and the connector arm 1014. In one embodiment, the connector arm 1014 is configured to fit snuggly within the rearward facing opening of a typical trailer hitch receiver 908.

Most vehicles 901 contain either a class I or class II trailer hitch receiver 908. The class rating distinguishes the size of the rearward facing opening of the trailer hitch receiver 908 and the amount of weight that the trailer hitch receiver 908 can support. The connector arm 1014 is sized differently in different embodiments so that it will fit in the desired class receiver. For example, in one embodiment, the connector arm is square and is sized to fit snuggly within a class 1 or class II trailer hitch receiver 908. In another embodiment, the connector arm 1014 is square and is sized to fit snuggly within a class III or IV trailer hitch receiver 908. In yet another embodiment, the connector arm 1014 is square and is sufficiently small in size to fit within any class of trailer hitch receiver. In this embodiment, any additional space between the connector arm 1014 and the trailer hitch receiver 908 can be filled using a sliding wedge collar, similar to the adapter 308, as shown in FIG. 3.

As mentioned above, class I, II, III, and IV trailer hitch receivers 908 are rated according to the amount of weight which can safely be attached to the trailer hitch receiver 908. In one embodiment, the vehicle mounted display device 900 is configured to be light weight such that the total weight of the vehicle mounted display device 900 is less than the weight limit of any of the four classes of trailer hitch receivers 908.

In one embodiment, the adjustable mounting unit 906 is configured to attach to a typical tow-ball hitch rather than a square trailer hitch receiver 908. A typical tow-ball hitch contains a ball shaped hitch attachment rather than a typical square opening, such as those described above. In one embodiment, the adjustable mounting unit 906 is configured to attach to a typical 1 and ⅞ inch tow-ball. In other embodiments, the adjustable mounting unit 906 is configured to attach to one of a 1.97 inch, 2 inch and 2⁵⁄₁₆ inch diameter tow-ball. In certain embodiments, the connector arm 1014 clamps onto the tow-ball with finger-like projections. In these embodiments, the connector arm 1014 is configured to securely attach to the tow-ball while allowing articulating and swivel motion with respect to the tow-ball.

In another embodiment, the adjustable mounting unit 906 is configured to attach to a pin-and-jaw-type trailer hitch. In this embodiment, the connector arm 1014 contains a flat section which contains a hole. The hole is sized to receive a pin which secures the connector arm 1014 to the pin-and-jaw-type trailer hitch receiver 908. One of skill in the art will recognize other mechanisms that can be used to attach the vehicle mounted display device 900 to different types of trailer hitches receivers 908.

Figure 10:
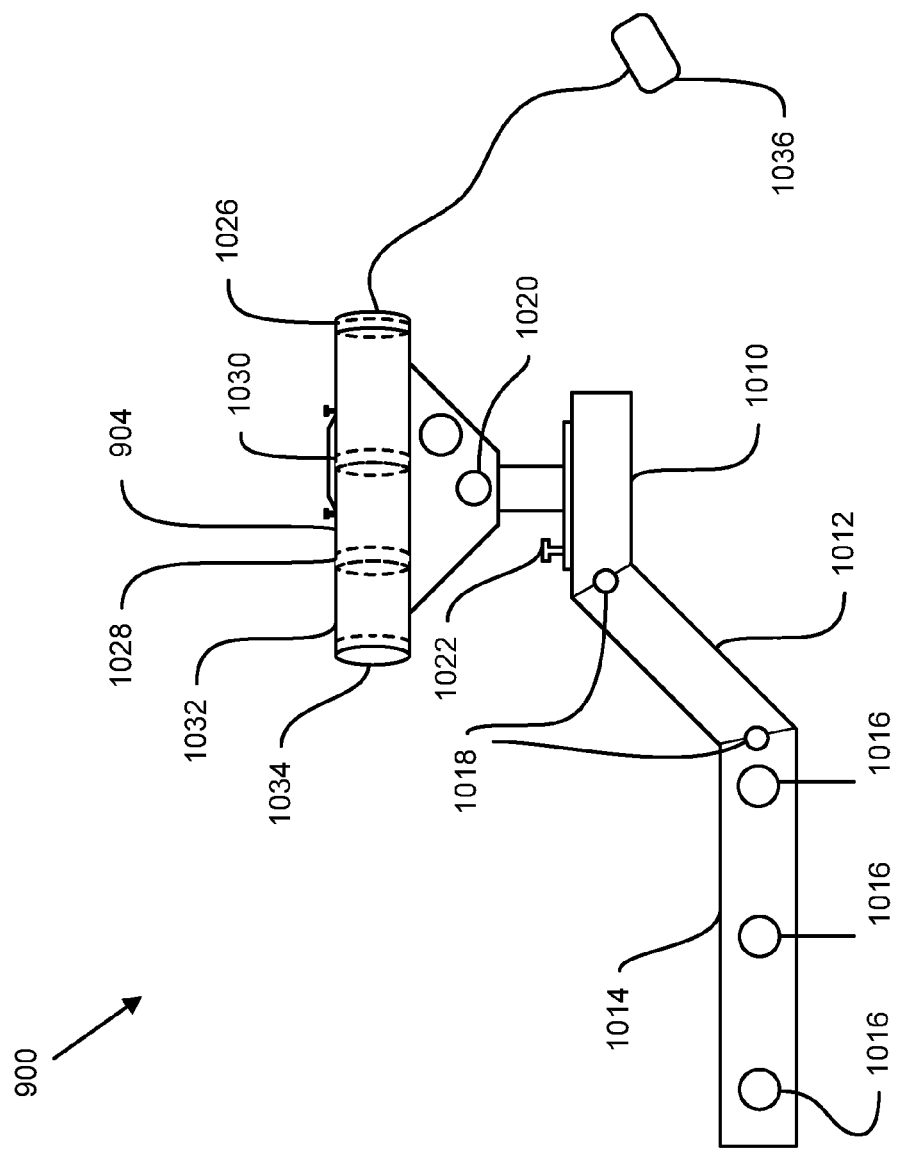
FIG. 10 is a side view diagram illustrating one embodiment of the adjustable mounting unit in accordance with embodiments of the disclosure.

FIG. 10 is a side view diagram illustrating one embodiment of the adjustable mounting unit in accordance with embodiments of the disclosure. As shown in FIG. 10, the connector arm 1014 may contain several sets of spaced holes 1016. The sets of holes 1016 are designed to align with a single set of holes in a typical trailer hitch receiver 908. When the set of holes of the trailer hitch receiver 908 is aligned with a single set of holes 1016 of the connector arm 1014, a corresponding hitch pin is placed through the aligned holes to hold the vehicle mounted display device 900 to the trailer hitch receiver 908. The connector arm 1014 may contain several sets of holes 1016 at different positions along the connector arm 1014. By aligning a different set of holes 1016 on the connector arm 1014 with the single set of holes on the trailer hitch receiver 908, the vehicle mounted display device 900 can be secured at different horizontal distances from the body of the vehicle 901.

Connecting the vehicle mounted display device 900 to a pre-existing trailer hitch receiver 908 is advantageous because the vehicle 901 does not need to be modified in order for the vehicle mounted display device 900 to function properly. In other words, the vehicle 901 can be quickly and easily customized through the use of a projected image by simply attaching the vehicle mounted display device 900 to the vehicle's trailer hitch receiver 908 and then turning on the projector 904. For example, a vehicle 901 with a class 1 trailer hitch receiver 908 can be customized by placing the connector arm 1014 within the trailer hitch receiver 908 and connecting the projector 904 to a power source that typically accompanies a trailer hitch receiver 908.

The vehicle mounted display device 900 is configured, in one embodiment, such that it does not impede the normal function of the vehicle 901. In many embodiments, this is accomplished by adjusting the positioning of the adjustable mounting unit 906 so that the projector 904 and the adjustable mounting unit 906 are a safe distance from both the vehicle 901 and a road upon which the vehicle 901 is moving. In one embodiment, the vehicle mounted display device 900 is positioned so that exterior doors of the vehicle 901 may still open and close while the vehicle mounted display device 900 is attached to the vehicle 901. In one embodiment, the vehicle mounted display device 900 is configured to remain attached to the vehicle 901 while the vehicle 901 is in motion so that the vehicle mounted display device 900 functions while the vehicle 901 is moving. In many embodiments, the vehicle mounted display device 900 need not be removed to perform common driving tasks such as opening and closing vehicle doors, moving the vehicle 901 in a reverse direction, normal driving, and opening and closing a tail gate door.

An image that is projected by the vehicle mounted display device 900 can be adjusted through the use of the adjustable mounting unit 906. By adjusting the position of the adjustable mounting unit 906 a user can choose the position of the image projected by the vehicle mounted display device 900. The image projected by the vehicle mounted display device 900 can also be adjusted by adjusting the location, orientation and focus of the projector 904. Both the projector 904 and the adjustable mounting unit 906 can be adjusted simultaneously in order to position the projected image on an outer surface of the vehicle 901. Additionally, the size of the projected image can be changed by adjusting the adjustable mounting unit 906 and by adjusting the projector 904. When the projector 904 and the adjustable mounting unit 906 are moved away from the vehicle 901, the projected image becomes larger.

Returning to FIG. 9, some vehicles 901 have glossy, highly-reflective surfaces which may not show a clear projected image. In order to make the projected image visible and clear on any type of vehicle 901 surface, some embodiments contain a mat 909 which is placed on the outer surface of the vehicle 901, as shown in FIG. 9. In one embodiment, a magnetic mat 909 is used which magnetically attaches to an outer surface of a vehicle 901. The mat 909 remains attached to the vehicle 901 while the vehicle 901 is in motion. In another embodiment, the mat 909 is attached to the surface of a vehicle 901 through the use of an adhesive. Those of skill in the art will recognize other means for attaching the mat 909 to an outer surface of a vehicle 901. A user can position the mat 909 on any exterior surface of a vehicle 901 onto which he or she desires to project an image. In the embodiment of FIG. 9, the mat 909 is attached to the center of the tailgate of a truck.

In one embodiment, the mat 909 has a matte finish. In another embodiment, the mat 909 is made of a clear material so that the color of the exterior surface of the vehicle 901 can be seen through the mat 909. In one embodiment, the mat 909 is a transparent sticker with a matte finish. In one embodiment, the mat 909 is made from a white material with a matte finish. In one embodiment, the mat 909 is made from a material supplied from Regional Supply called Oracle 631 exhibition and is a transparent material with a matte finish. In another embodiment, the mat 909 is made from a different product supplied by Regional Supply called Magna 24 and is a white magnetic sheet. In another embodiment, the mat 909 is a magnetic screen which is magnetically attached to an outer surface of an automobile.

In another embodiment, an image is projected directly onto an outer surface of a vehicle 901 without the use of a mat 909. This may be done for any vehicle 901, but may present the clearest image on a vehicle 901 with a white outer surface.

Now directing the focus to FIG. 10, a side view of the vehicle mounted display device 900 is shown. The vehicle mounted display device 900 contains an adjustable mounting unit 906, a projector 904, and a power cord 1036. Certain embodiments of the adjustable mounting unit 906 may contain a connector arm 1014, an intermediate arm 1012, and a projector arm 1010. The adjustable mounting unit 906 is not required to contain a certain number of arms but may contain one arm or several arms. For example, in one embodiment, the adjustable mounting unit 906 may consist solely of a connector arm 1014 (not shown). A lateral end of the connector arm 1014 may connect to a typical trailer hitch receiver 908 while an opposite lateral end may connect with the projector 904. The projector 904 may be movably connected with the connector arm 1014 such that it can move in the horizontal and vertical directions. In this manner, the image projected by the projector 904 can be placed on an outside surface of a vehicle 901 in several different locations. One of skill in the art will recognize that the orientation and number of arms 1010, 1012, 1014 can be changed without departing from the claimed invention.

In one embodiment, connection points 1018 between the connector arm 1014, intermediate arm 1012 and projector arm 1010 are fixed such that the connector arm 1014, intermediate arm 1012 and projector arm 1010 are fixed in relation to each other. The intermediate arm 1012 may connect the connector arm 1014 and the projector arm 1010 and may be angled such that the projector arm 1010 is elevated above the connector arm 1014.

In other embodiments, the connection points 1018 between the connector arm, intermediate arm 1012 and projector arm 1010 are movable such that the arms 1010, 1012, 1014 can move in relation to each other. In one embodiment, a user can loosen the connection points between the arms 1010, 1012, 1014, place the projector 904 in the desired location and orientation, and then tighten the connection points 1018 between the arms 1010, 1012, 1014, fixing the orientation and position of the adjustable mounting unit 906. When the connection points 1018 between the arms 1010, 1012, 1014 are tightened, the arms 1010, 1012, 1014 remain substantially fixed with relation to each other. When the connection points 1018 between the arms 1010, 1012, 1014 are loosened, the arms 1010, 1012, 1014 can be moved in relation to each other. The connection points 1018 can be tightened and loosened through the use of a bolt and wing nut fastener, a bolt and nut fastener, a friction fit, or other adjustable fastener. One of skill in the art will recognize other mechanisms which can be used to loosen and tighten the connection points 1018 between the arms 1010, 1012, 1014. By moving the adjustable mounting unit 906, the size, shape, focus, and position of a projected image can be changed. If a bigger image is desired, the adjustable mounting unit 906 is moved away from the vehicle's surface.

In the embodiment of FIG. 10, the projector 904 is movably attached to the projector 904 arm. The projector 904 is able to rotate horizontally so that the projected image can be placed at different lateral positions on the exterior surface of the vehicle 901. The projector 904 also contains a pivot point 1020 which allows the projector 904 to rotate in a vertical plane so that the projected image can be placed at different vertical positions on the exterior surface of the vehicle 901. By rotating the projector 904 in both the horizontal and vertical planes, the projector 904 can be positioned at different radial positions. As was the case with certain embodiments of the adjustable mounting unit 906, the projector 904 contains tightenable connection points 1018 to allow the projector 904 to be adjustable.

In one embodiment, the adjustable mounting unit 906 further comprises a safety feature configured to prevent the projector 904 from pointing away from the outer surface of the vehicle 901. The safety feature may contain notches or plates that prevent the arms of the adjustable mounting unit 906 from rotating away from the vehicle 901. FIG. 10 shows a safety feature which includes a screw 1022 which is positioned to prevent the projector 904 from rotating laterally to face away from the outer surface of the vehicle 901 onto which the vehicle mounted display device 900 is attached. In other embodiments, a protrusion, slot and screw, or other device or method may be used to prevent the projector 904 from facing away from the outer surface of the vehicle 901 onto which it is attached.

In one embodiment, at least one of the connector 1014, intermediate 1012, and projector 1010 arms is telescopic. The telescoping movement allows a user to position the projector 904 such that the image projected on a surface of the vehicle 901 can be changed in size and focus.

The vehicle mounted display device 900 contains a projector which is configured to project an image onto an outer surface of a vehicle 901. The projector 904 can be any type of device that can project an image onto a surface. In one embodiment, the projector 904 contains a light source 1026, at least one lens 1028 and a cavity configured to receive an image cartridge 1030. The light source 1026 is contained on one lateral end of the projector 904 and the image cartridge 1030 is situated between the light source 1026 and the lens 1028.

The image projected by the projector can be focused by moving the image cartridge 1030 with respect to the lens 1028. In other embodiments, the projector may contain more than one lens 1028. Each lens 1028 may be movable with respect to the image cartridge 1030 so that the image can be focused. The light source 1026 within the projector 904 shines light through the image cartridge 1030 and the lens 1028 and is then projected onto an outer surface of a vehicle 901. The image that is projected onto the vehicle 901 surface is determined by the image contained on the image cartridge 1030.

The projector may contain an outer shell 1032. In one embodiment, the outer shell 1032 is a waterproof and weather proof outer shell 1032. In another embodiment, the outer shell 1032 is made of a metal material so that it can withstand collisions with rocks and other debris while the vehicle 901 is in motion. In another embodiment, the outer shell 1032 is made of a hard plastic material.

FIG. 10 shows a projector 904 with at least one lens 1028. The lens 1028 is situated on one side of the image cartridge 1030 while the light source is placed on an opposite side of the image cartridge 1030. In one embodiment, the projector 904 contains only one lens 1028. In a variation of this embodiment, the projector 904 contains a lens 1028 and a clear plastic cover on a projecting end of the projector 904. The clear plastic cover prevents water and debris from entering the projector 904. In another embodiment, the projector 904 contains a keystone lens 1034 situated on the projecting end of the projector 904. In this embodiment, the keystone lens 1034 acts as a corrective lens 1028 which is used to sharpen the image and also helps to keep moisture and debris from entering the projector 904.

FIG. 10 also shows the orientation and position of the image cartridge 1030 within the projector 904. As mentioned above, in one embodiment, the image cartridge 1030 can be moved laterally to focus the image. The image cartridge 1030 may be moved through the use of a rotary dial that is disposed on an outer surface of the projector 904. The rotary dial may move the image cartridge 1030 with respect to the lens 1028 to focus the projected image. In another embodiment, the image cartridge 1030 may be moved through the use of a tab which is attached to the image cartridge 1030 and is accessible on an outer surface of the projector 904.

In one embodiment, the image cartridge 1030 contains custom images. The custom images can be designed by a user or chosen from a database of images. In one embodiment, the image cartridge 1030 is configured to contain an image of a company's logo. The company logo can then be displayed on an outer surface of a vehicle 901. In another embodiment, the image cartridge 1030 contains an image of a sports team logo which can be displayed on an outer surface of a vehicle 901. In another embodiment, the image cartridge 1030 may contain a seasonal image. In another embodiment, the image cartridge 1030 may contain a vehicle maker's logo.

In one embodiment, the image cartridge 1030 is composed of a clear plastic slide with a rigid frame. When light is shined through the clear plastic slide and through the lenses 1028, 1034, an image is projected onto the vehicle 901. The clear plastic slide may have an image printed thereon so that an image is projected onto the outer surface of the vehicle 901.

FIG. 10 also shows that the projector 904 contains a light source 1026. The light source 1026 is situated on the opposite lateral end of the projector 904 from a projector 904 opening. The light source 1026 is configured to shine through the image cartridge 1030 to project an image onto the outer surface of a vehicle 901. In one embodiment, the light source 1026 may be an LED. In one embodiment, the light source 1026 is a single LED. In another embodiment, the light source 1026 contains several LEDs. In another embodiment, the light source 1026 is a light bulb. One of skill in the art will recognize other light sources 1026 which can be placed in the projector 904 to project an image onto a surface of a vehicle 901.

In one embodiment, the vehicle mounted display device 900 also contains a power source. In one embodiment, the power source is a battery which is contained within the adjustable mounting unit 906. In another embodiment, the power source is a battery which is contained within the projector 904. In the embodiment of FIG. 2, the power source is external to the vehicle mounted display device 900 and is connected to the vehicle mounted display device 900 through a power cord 1036.

Vehicles 901 which contain trailer hitch receivers 908 typically contain a trailer light receptacle which is configured to power the lights of a trailer. The vehicle mounted display device 900 may contain a power cord 1036 which is configured to connect to a typical trailer light receptacle. In those vehicles 901 which contain a trailer hitch receiver 908, the trailer light receptacle is typically very close to the trailer hitch receiver 908, such that the trailer light receptacle is a very convenient power source.

Figure 11:
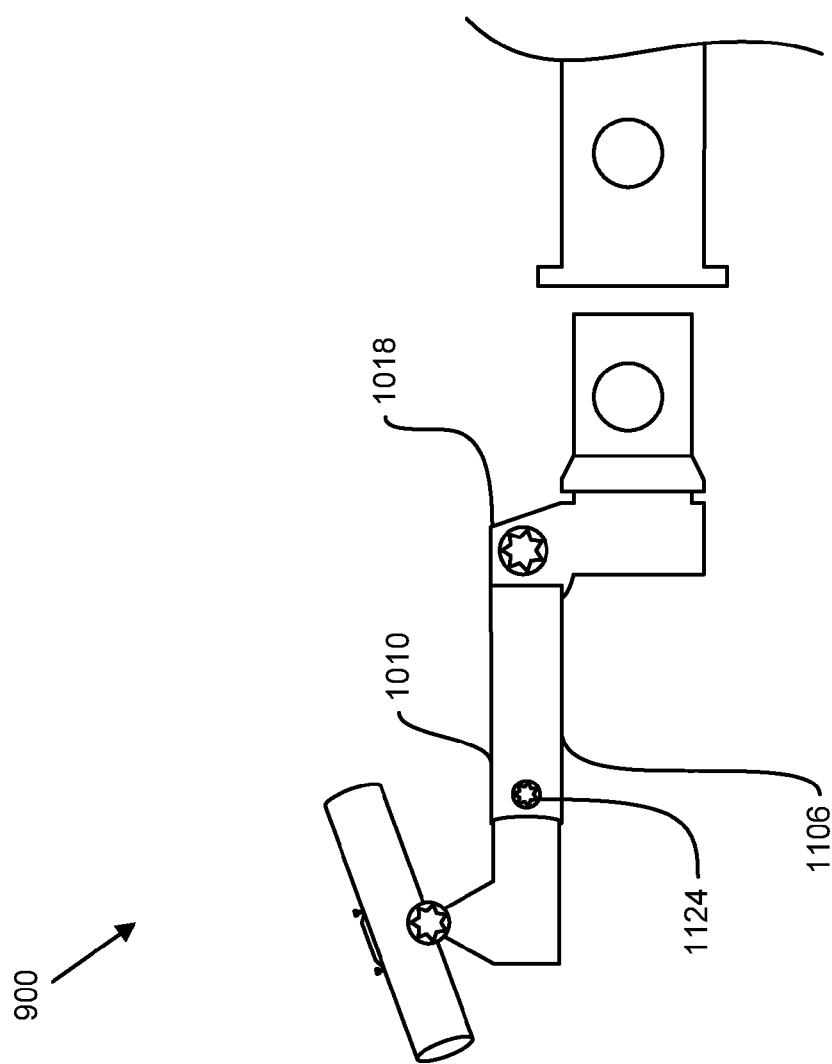
FIG. 11 is a side view diagram illustrating another embodiment of vehicle mounted display device in accordance with embodiments of the disclosure.

FIG. 11 is a side view diagram illustrating another embodiment of vehicle mounted display device 900 in accordance with embodiments of the disclosure. In the depicted embodiment, the adjustable mounting unit 906 contains a tubular intermediate arm 1106 and a lock pin 1124 to lock the intermediate arm 1106 in position.

Figure 12:
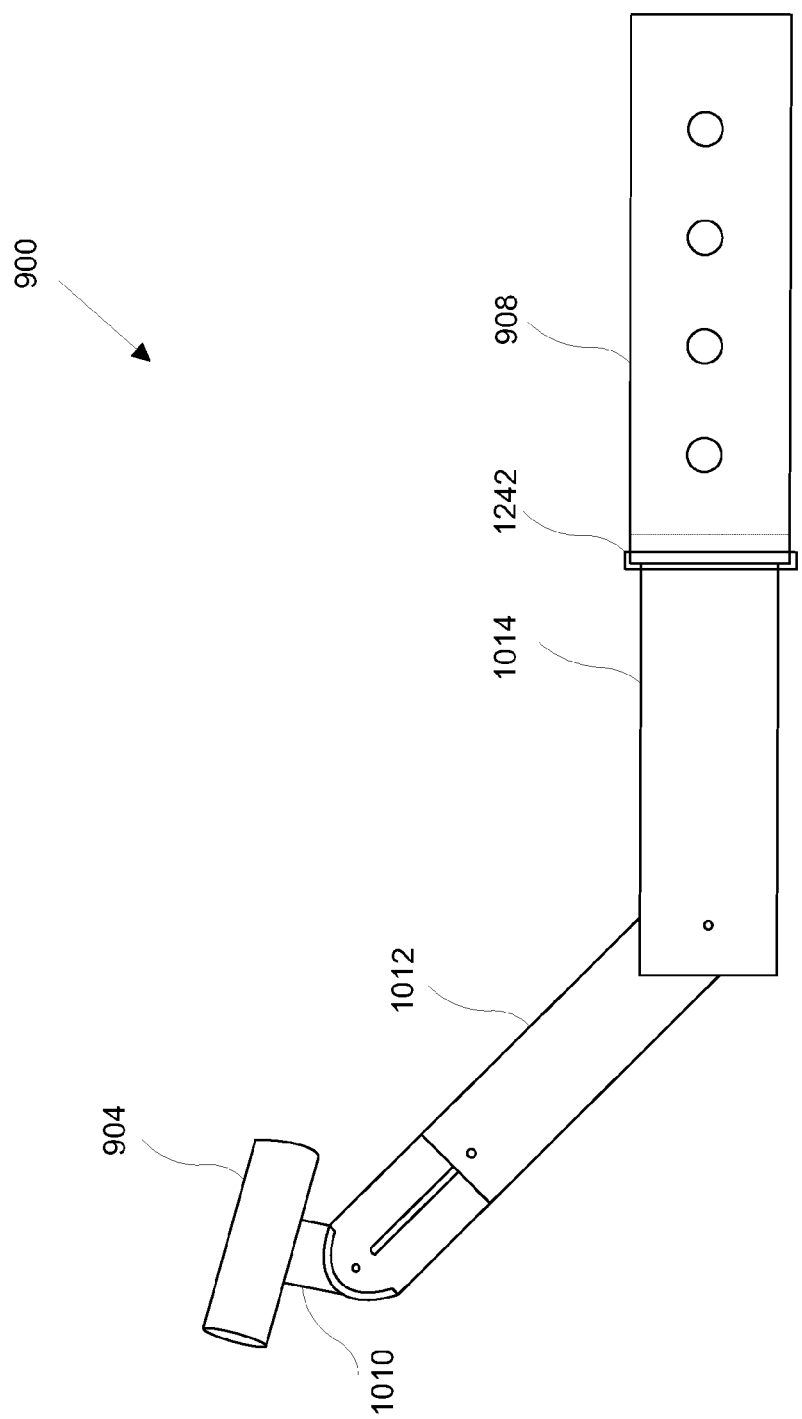
FIG. 12 is a side view diagram illustrating another embodiment of the vehicle mounted display device in accordance with embodiments of the disclosure.

FIG. 12 is a side view diagram illustrating another embodiment of the vehicle mounted display device in accordance with embodiments of the disclosure. In the depicted embodiment, the adjustable mounting unit 906 contains a connector arm 1014, an intermediate arm 1012, and a projector arm 1010. A compressible foam rubber collar 1242 is pushed tight against the receiver hitch to keep the vibrations dampened.

Figure 13:
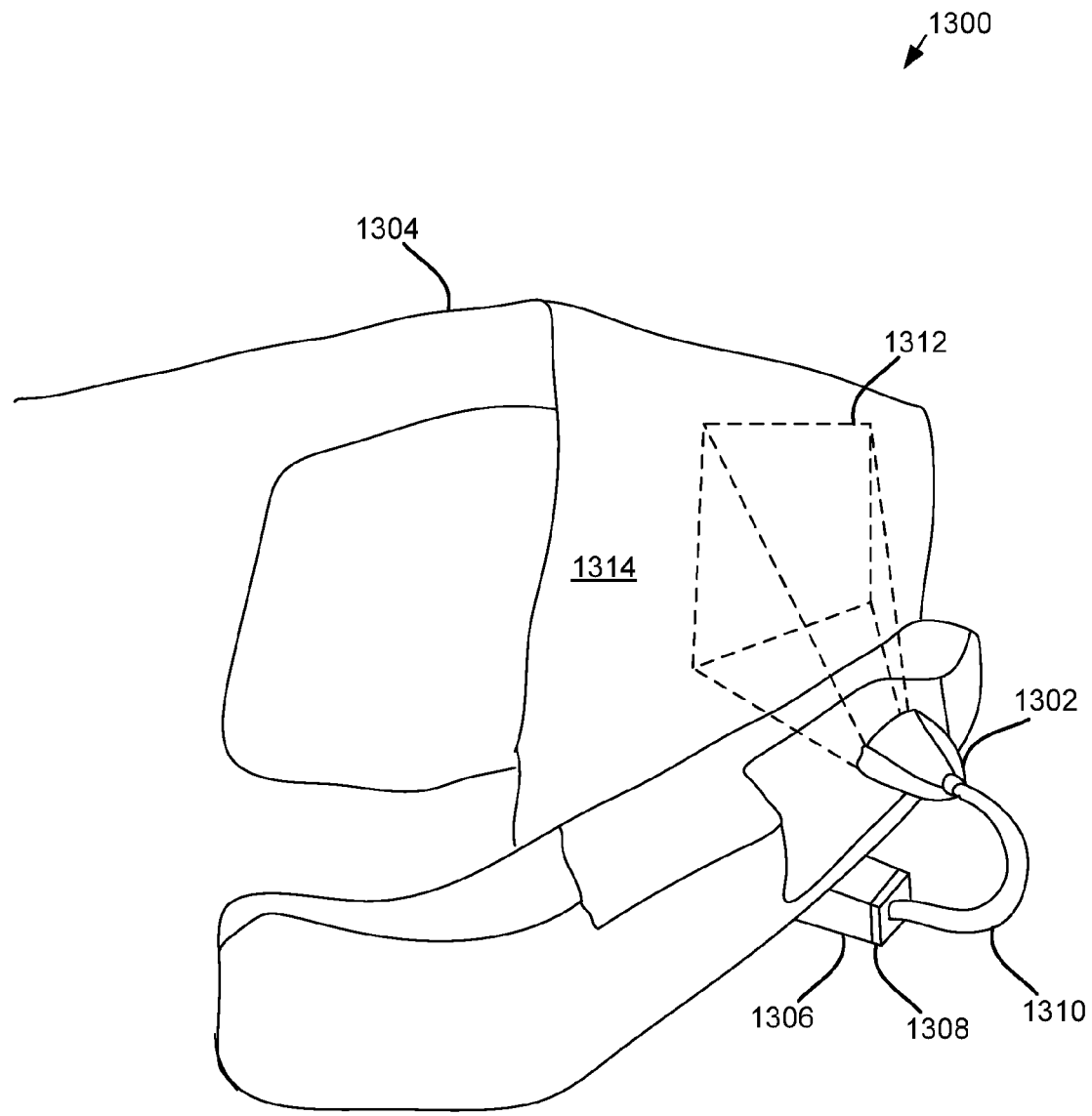
FIG. 13 is a perspective view diagram illustrating one embodiment of a flexible mounting device in accordance with embodiments of the disclosure.

FIG. 13 is a perspective view diagram illustrating one embodiment of a flexible mounting device 1300 in accordance with embodiments of the disclosure. The flexible mounting device 1300, in one embodiment, is configured to flexibly mount the projector 1302 to a vehicle 1304 for ease of positioning of the projector 1302. The flexible mounting device 1300 provides a secure, adjustable mount and power supply for the projector 1302.

In one embodiment, the flexible mounting device 1300 is configured to attach to a hitch receiver tube 1306 of the vehicle 1304. The hitch receiver tube 1306, as is known to those of skill in the art, extends outward from the frame of the vehicle 1304. The hitch receiver tube 1306 is part of a hitch receiver (not shown) that mounts to the frame of the vehicle 1304. The hitch receiver tube 1306, in one embodiment, has an opening with a square cross-sectional profile. The opening of the receiver tube 1306 may be in the range of between about 1.25" and 2.5."

The flexible mounting device 1300 includes a mount bar 1308. The mount bar 1308 is insertable into the hitch receiver tube 1306. A hitch pin (see FIG. 10) secures the mount bar 1308 with the hitch receiver tube 1306. Disposed between the mount bar 1308 and the projector 1302 is a flexible arm 1310. The flexible arm 1310 is formed with a first end that couples to the mount bar 1308, and a second end that couples with the projector 1302. The flexible arm 1310 is formed of a material that is substantially rigid while still allowing for positioning of the projector 1302. The flexible arm 1310 is, in one embodiment, hollow so that power wires may pass through the flexible arm 1310 from the vehicle 1304 to the projector 1302, as will be discussed in greater detail below with reference to FIG. 12.

The flexible arm 1310 is formed of a material that allows for positioning of the projector 1302 but is resistant to movement with reference to the vehicle 1304 from environmental forces. In other words, the flexible arm 1310 is positionable by a user, but resists movement from environmental forces such as bumps in the road. In one embodiment, the flexible arm is formed of a rolled metal tubing also known as gooseneck tubing or piping. The flexible arm 1310, in one embodiment, is configured with a length in the range of between about 1 and 36 inches. In a further embodiment, the length is in the range of between about 12 and 24 inches. The diameter of the flexible arm 1310 is in the range of between about ¼ and 3 inches.

The flexible arm 1310 is positionable to aim the projector 1302 towards a surface of the vehicle 1304. In the depicted embodiment, the flexible arm 1310 positions the projector 1302 such that the projector 1302 projects an image 1312 onto a tailgate 1314 of the vehicle 1304. In another embodiment, the projector 1302 is capable of displaying the image 1312 on any surface of the vehicle 1304 that is in proximity to the hitch receiver tube 1306. Typically hitch receiver tubes 1306 are positioned in the rear of the vehicle, and accordingly, the projector 1302 may display the image 1312 on a rear outer surface of the vehicle 1304.

Figure 14:
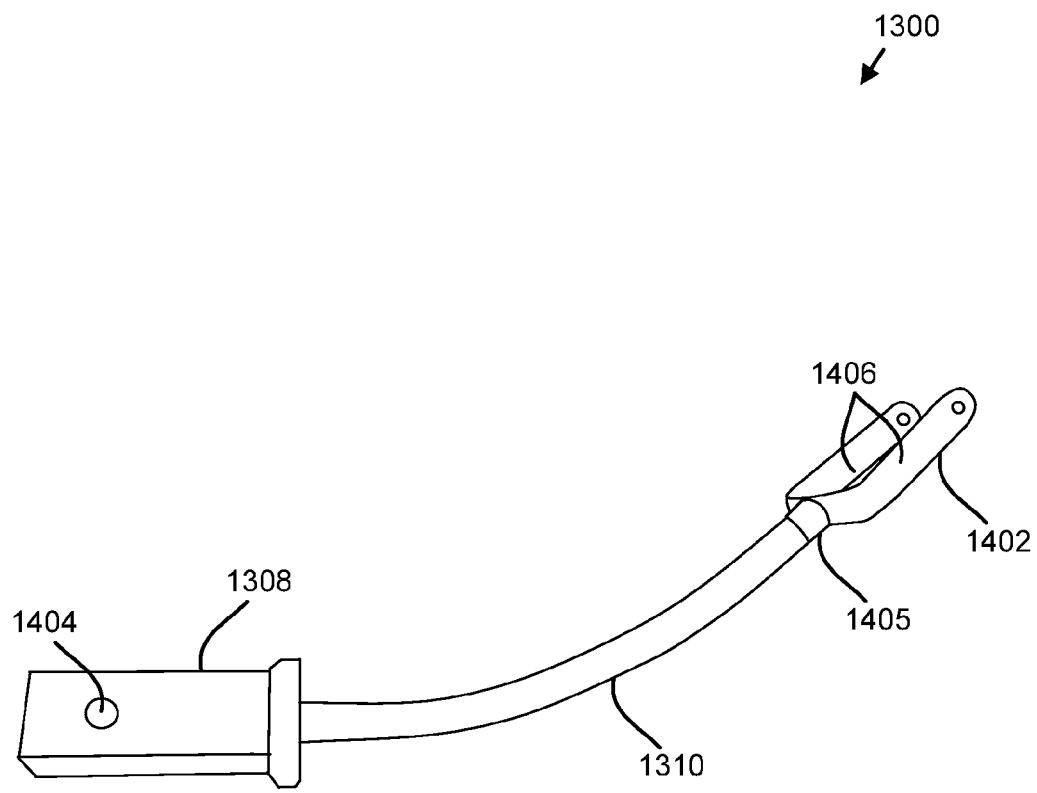
FIG. 14 is a side perspective view diagram illustrating one embodiment of the flexible mounting device in accordance with embodiments of the disclosure.

FIG. 14 is a side perspective view diagram illustrating one embodiment of the flexible mounting device 1300 in accordance with embodiments of the disclosure. The flexible mounting device 1300, as described above, may be formed having the mount bar 1308, the flexible arm 1310, and a projector mounting bracket 1402. The mount bar 1308, in one embodiment, is formed of a substantially rigid material such as, but not limited to, steel. The mount bar 1308 has a cross-sectional profile that is configured to engage and insert into the hitch receiver tube 1306. A hitch pin 1404 insertable into openings in the hitch receiver tube 1306 and the mount bar 1308 to secure the mount bar 1308 to the hitch receiver tube 1306.

The flexible arm 1310 may be permanently or removably coupled to the mount bar 1308. In other words, the flexible arm 1310 may be welded, in one embodiment, to the mount bar 1308. In another embodiment, the flexible arm 1310 may be provided with a threaded adapter that couples with a corresponding threaded adapter of the mount bar 1308. In other embodiments, any type of suitable fastener may be utilized to couple the flexible arm 1310 to the mount bar 1308.

The flexible arm 1310 is disposed between and couples the mount bar 1308 and the projector mounting bracket 1402.

Once positioned, the flexible arm 1310 maintains the position of the projector mounting bracket 1402 with respect to the mount bar 1308. The projector mounting bracket 1402 may be, like the mount bar 1308, permanently or removably coupled to the flexible arm 1310. Stated differently, the projector mounting bracket 1402 may be welded to the flexible arm 1310, or coupled using any suitable fastener such as a threaded adapter 1405.

The projector mounting bracket 1402, in one embodiment, is formed of a rigid material, including but not limited to, metal, or rigid plastics. In one example, the projector mounting bracket 1402 is a "U" shaped bracket having a pair of support arms 1406. The support arms 1406 extend outward from the flexible arm 1310 in a generally parallel manner. The support arms 1406 are positioned with a distance selected to engage the projector 1302. In other words, the distance between the support arms 1406 is substantially equivalent to a width of the projector 1302. The projector mounting bracket will be discussed in greater detail below with reference to FIG. 13.

Figure 15:
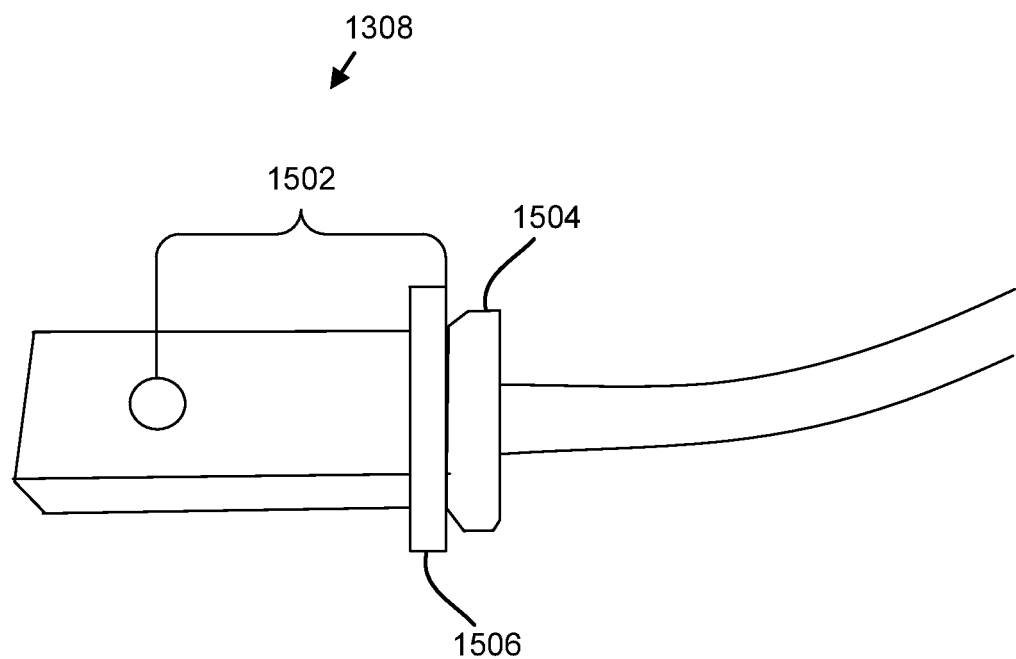
FIG. 15 is a partial side perspective view diagram illustrating one embodiment of the mount bar in accordance with embodiments of the disclosure.

FIG. 15 is a partial side perspective view diagram illustrating one embodiment of the mount bar 1308 in accordance with embodiments of the disclosure. The mount bar 1308 may be configured with a shank length 1502 selected to minimize movement of the mount bar 1308 within the hitch receiver tube 1306. As used herein, "shank length" refers to the distance between a mount bar collar 1504 and the hitch pin 1404. The shank length 1502 is selected to minimize mount bar 1308 rattle/movement. If the shank length 1502 is too long, there will be a gap between the mount bar collar 1504 and the hitch receiver tube and subsequently, the mount bar 1308 may move excessively as the vehicle 1304 travels down a road.

In one embodiment, the shank length 1502 is in the range of between about 2 inches and 12 inches. The shank length 1502 is determined, in part, by the distance of a hitch pin opening in the hitch receiver tube 1306 and the end of the hitch receiver tube 1306. As this distance may vary from vehicle to vehicle, the mount bar 1308 may be provided with a compressible collar 1506. The compressible collar 1506 is, in one embodiment, disposed between the mount bar collar 1504 and the hitch receiver tube 1306. The compressible collar 1506 may be formed of any compressible material that is suitable for use in an outdoor environment. The compressible collar 1506 inhibits movement of the mount bar 1308 by biasing the mount bar 1308 with respect to the hitch receiver tube 1306. Stated differently, the compressible collar 1506 takes up any slack movement between the mount bar 1308 and the hitch receiver tube 1306.

Figure 16:
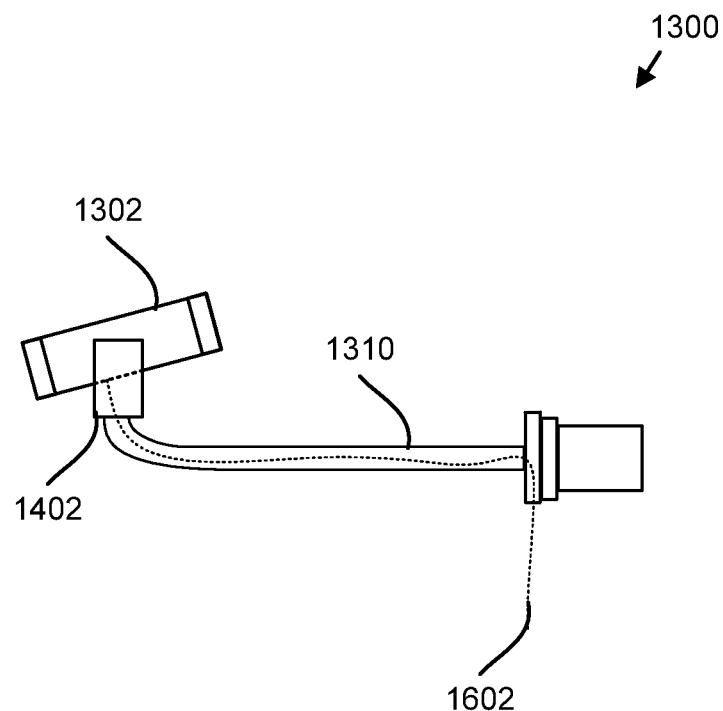
FIG. 16 is a side view block diagram illustrating one embodiment of the flexible projector mount in accordance with embodiments of the disclosure.

FIG. 16 is a side view block diagram illustrating one embodiment of the flexible projector mount 1300 in accordance with embodiments of the disclosure. The flexible projector mount 1300, as discussed above, is formed with a flexible arm 1310 disposed between the mount bar 1308 and the projector mounting bracket 1402. The flexible arm 1310, in one embodiment, is a tube and configured as a conduit for an electrical connection between the projector 1302 and the vehicle 1304. The electrical connection 1602 may supply power to the projector 1302. In another embodiment, the electrical connection 1602 also includes a data link to the projector 1302. In a further embodiment, the electrical connection 1602 includes a plug configured to plug into a trailer light receiver.

Figure 17:
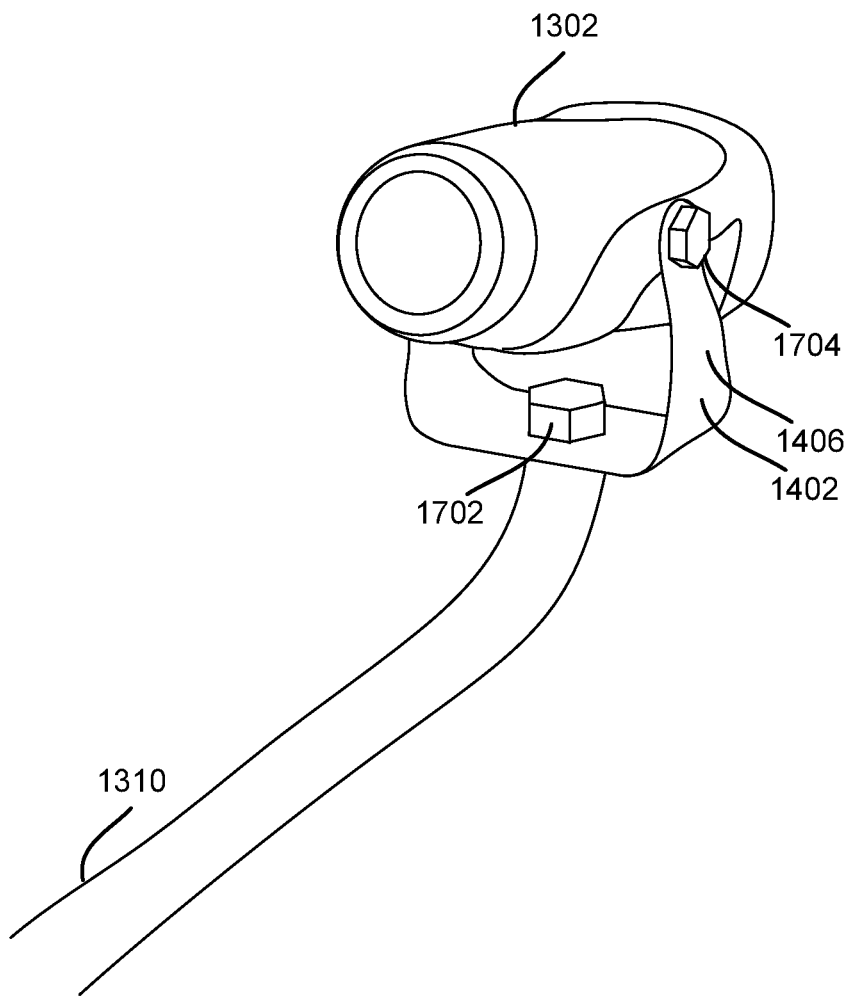
FIG. 17 is a perspective view diagram illustrating one embodiment of the projector mounting bracket in accordance with embodiments of the disclosure.

FIG. 17 is a perspective view diagram illustrating one embodiment of the projector mounting bracket 1402 in accordance with embodiments of the disclosure. The projector mounting bracket 1402, in one embodiment, is coupled to the flexible arm with a fastener 1702. The fastener 1702, as depicted, may be a bolt that secures the projector mounting bracket 1402 into a threaded opening in the flexible arm 1310.

Similarly, fasteners 1704 may couple the projector 1302 to the projector mounting bracket 1402. As discussed previously, the projector mounting bracket 1402 may be a "U" shaped bracket with the support arms 1406 extending outward to couple to the sides of the projector 1302. Other mounting brackets are contemplated, including but not limited to, single point brackets, etc.

Figure 18:
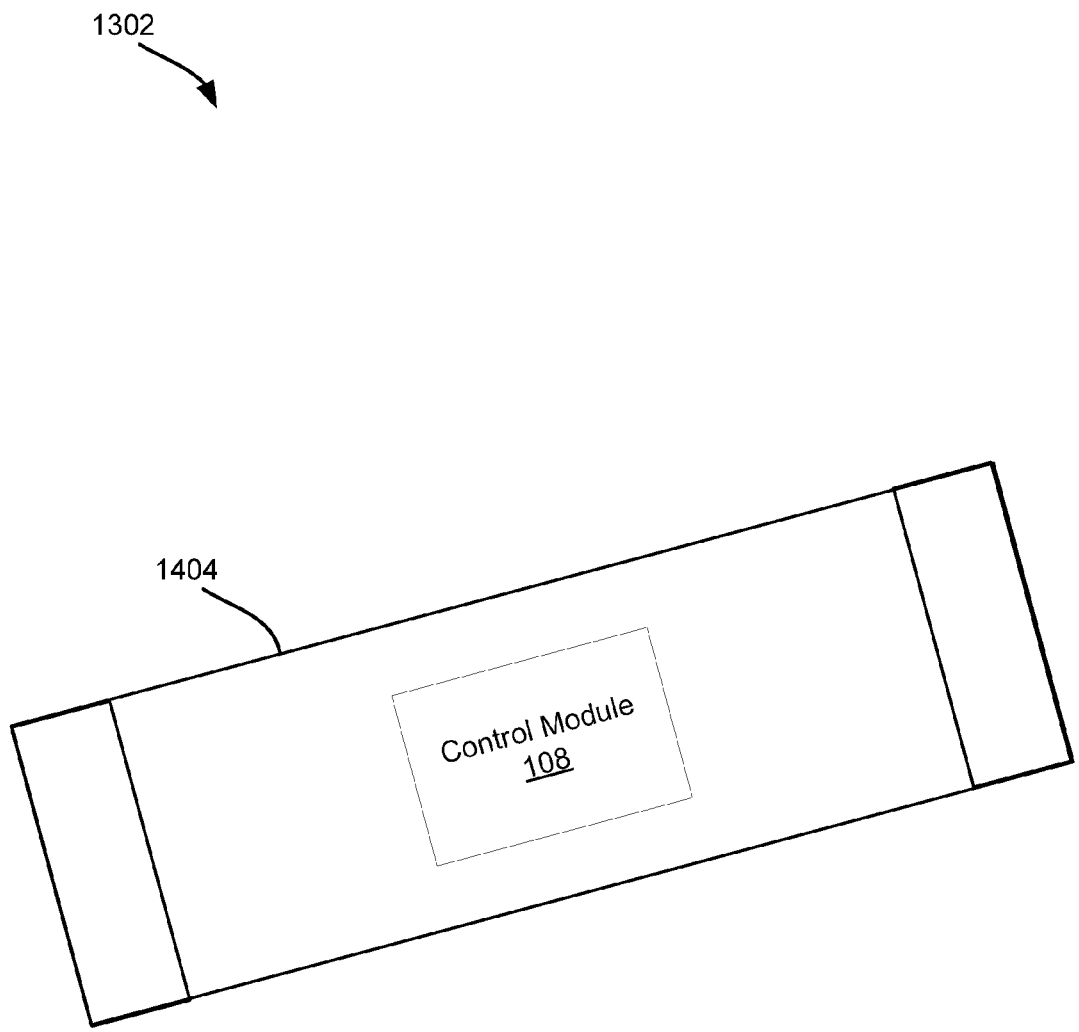
FIG. 18 is a schematic block diagram illustrating one embodiment of the projector in accordance with embodiments of the disclosure.

FIG. 18 is a schematic block diagram illustrating one embodiment of the projector 1302 in accordance with embodiments of the disclosure. The projector 1302 is similar to the projector described above with reference to FIGS. 1-8. In one embodiment, the projector 1302 is formed with a housing 1404 configured to enclose all of the necessary components for operation. In other words, the above described control module 108 may be housed within the housing 1404. All communication components (e.g., wireless or wireline communication devices) may also be housed within the housing.

Figure 19:
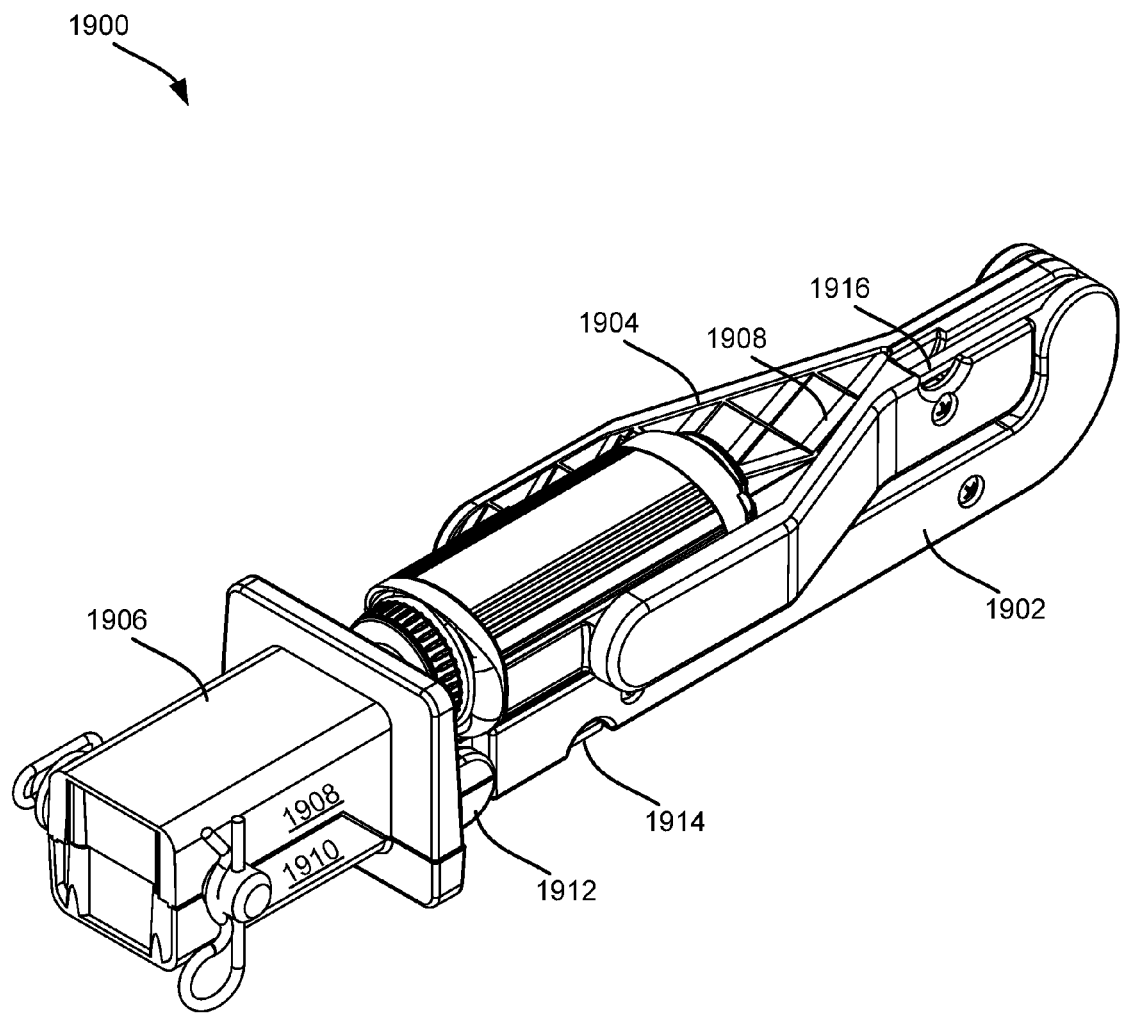
FIGS. 19 and 20 are diagrams illustrating one embodiment of a positionable mounting device in accordance with embodiments of the disclosure.
Figure 20:
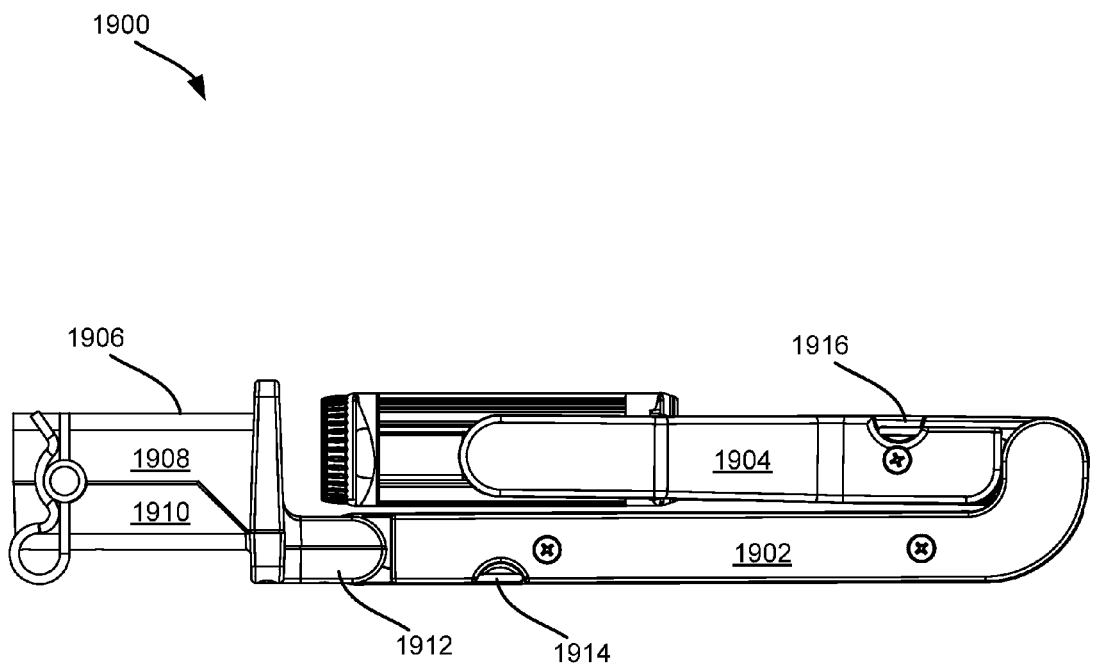

FIGS. 19 and 20 are diagrams illustrating one embodiment of a positionable mounting device 1900 in accordance with embodiments of the disclosure. In one embodiment, the positionable mounting device 1900 includes a plurality of positionable arms, in a manner similar to the mounting device described above with respect to FIGS. 9-12. The positionable mounting device 1900 may be transitioned between a closed position, as depicted here, and an open position (see FIG. 20). In addition, the positionable mounting device 1900 is capable of locking a position of an intermediate arm 1902 and a projector arm 1904 in a variety of different orientations with respect to the mount bar 1906.

The positionable mounting device 1900, as will be described in FIGS. 19-25, may be formed of any rigid material. In some embodiment, the positionable mounting device 1900 is formed of a high strength polymer, such as polycarbonate. Alternatively, the positionable mounting device 1900 may be formed of any other rigid material, including but not limited to, metals, and composites of metals and polymers. The intermediate arm 1902 and the projector arm 1904 may be formed with internal support structures 1908. The internal support structures 1908 are configured to strengthen the intermediate and projector arms 1902, 1904.

In the closed or collapsed position, as depicted, the projector arm 1904 rotates towards and engages the intermediate arm 1902. The length of the intermediate arm 1902, in one embodiment, is selected to allow the projector arm 1904 to be able to fully collapse and rest on top of the intermediate arm 1902.

In one embodiment, the bar mount 1906 is formed of an upper portion 1908 and a lower portion 1910. In other embodiments, the bar mount 1906 is a single unit. The upper portion 1908 and the lower portion 1910, in one example, beneficially allow the bar mount 1906 to engage the intermediate arm 1902 at a coupling point 1912. The multiple portions (i.e., 1908, 1910) allow the bar mount 1906 coupling point 1912 to be assembled around locking pivot points (see FIG. 23) of the intermediate arm 1902. The locking pivot point is lockable/releasable via button 1914. In a similar manner, the projector arm 1904 is positionable with reference to the intermediate arm 1902 and lockable/releasable via button 1916.

Figure 21:
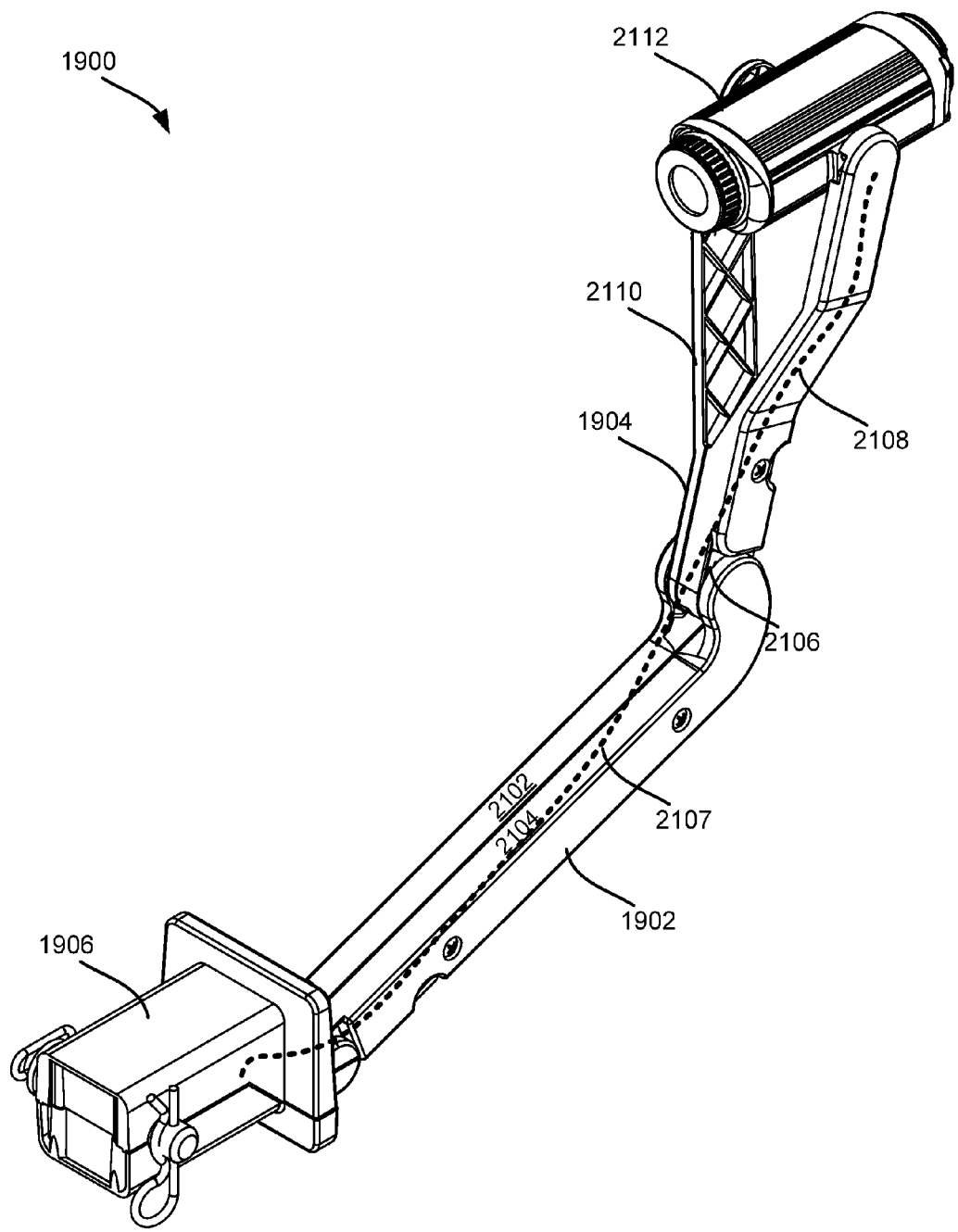
FIG. 21 is a perspective view diagram illustrating one embodiment of the positionable mounting device in the open position in accordance with embodiments of the disclosure.

FIG. 21 is a perspective view diagram illustrating one embodiment of the positionable mounting device in the open position in accordance with embodiments of the disclosure. As described above, the positionable mounting device 1900 is configured so that the intermediate arm 1902 and the projector arm 1904 are positionable and lockable. The intermediate arm 1902, in one embodiment, is positionable and lockable with reference to the mount bar 1906, and the projector arm 1904 is positionable and lockable with reference to the intermediate arm 102. For ease of assembly, the intermediate arm 1902 may be formed of two halves 2102, 2104. In a manner similar to the bar mount 1906, the halves 2102, 2104 may be assembled around a locking pivot point 2106 of the projector mount 1904. Furthermore, the projector mount 1904 may also be assembled of two halves 2108, 2110 so that the projector mount 1904 engages protrusions of the projector 2112. The halves 2102, 2104 of the intermediate arm, the halves 2108, 2110 of the projector arm 1904, and the upper and lower portion of the bar mount 1906 may each be fastened to each other, respectively, via fasteners such as screws. In a further embodiment, the intermediate arm 1902 and the projector arm 1904 may form a conduit through which an electrical connection 2107 may pass and electrically couple the projector 2112 with a power source of the vehicle (e.g., car battery).

Figure 22:
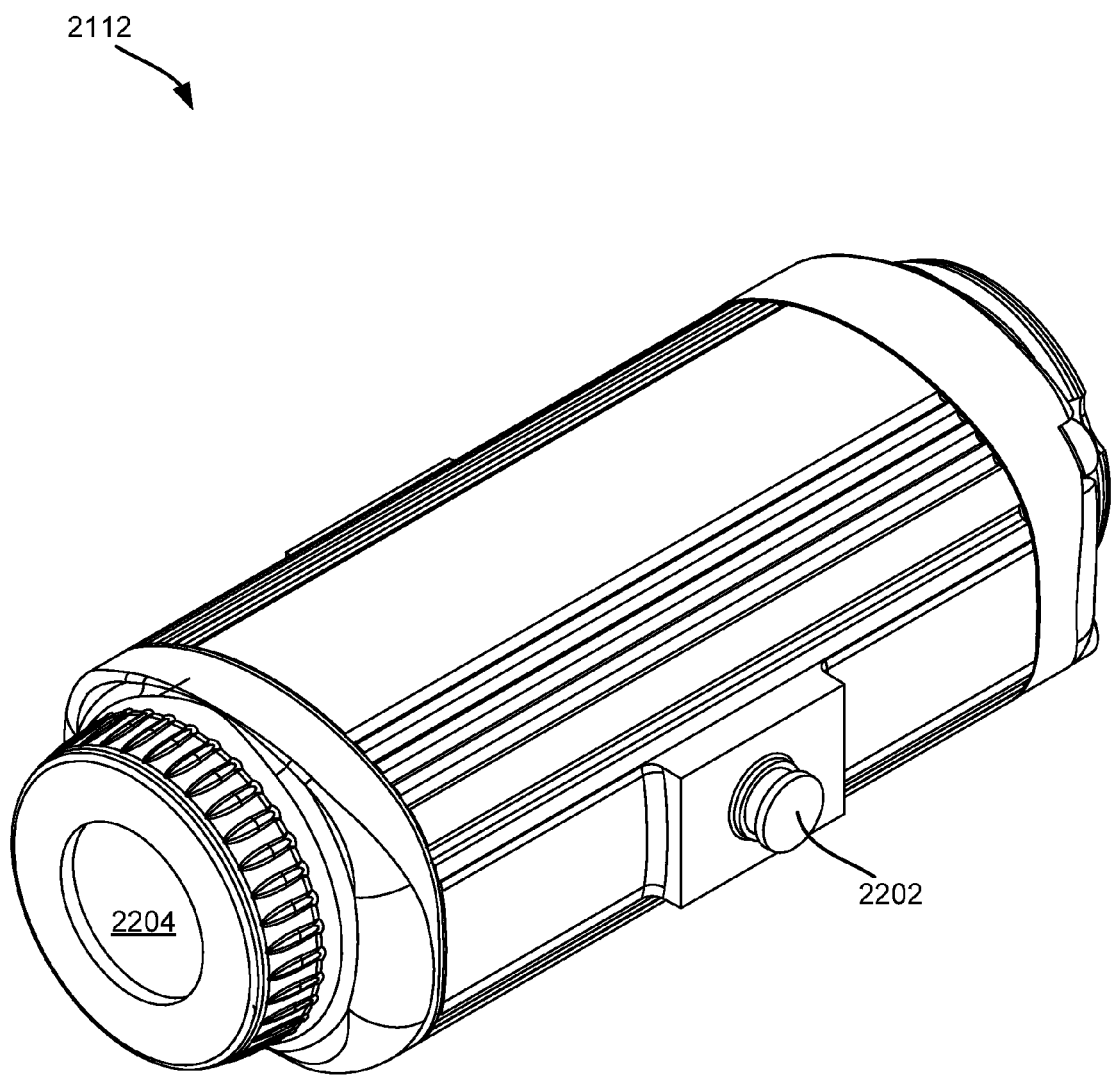
FIG. 22 is a perspective view diagram of the projector in accordance with embodiments of the disclosure.

FIG. 22 is a perspective view diagram of the projector 2112 in accordance with embodiments of the disclosure. In the depicted embodiment, the projector 2112 includes protrusions 2202 that extend outward from a projector housing laterally (i.e., to the side). The protrusions 2202 may be circular as depicted. Alternatively, the protrusions 2202 may resemble other geometric shapes including, but not limited to, squares, hexagons, etc. The circular protrusions 2202 allow for the vertical positioning of the projector 2112. In other words, the lens 2204 of the projector may be positioned pointing upwards or downwards.

Figure 23:
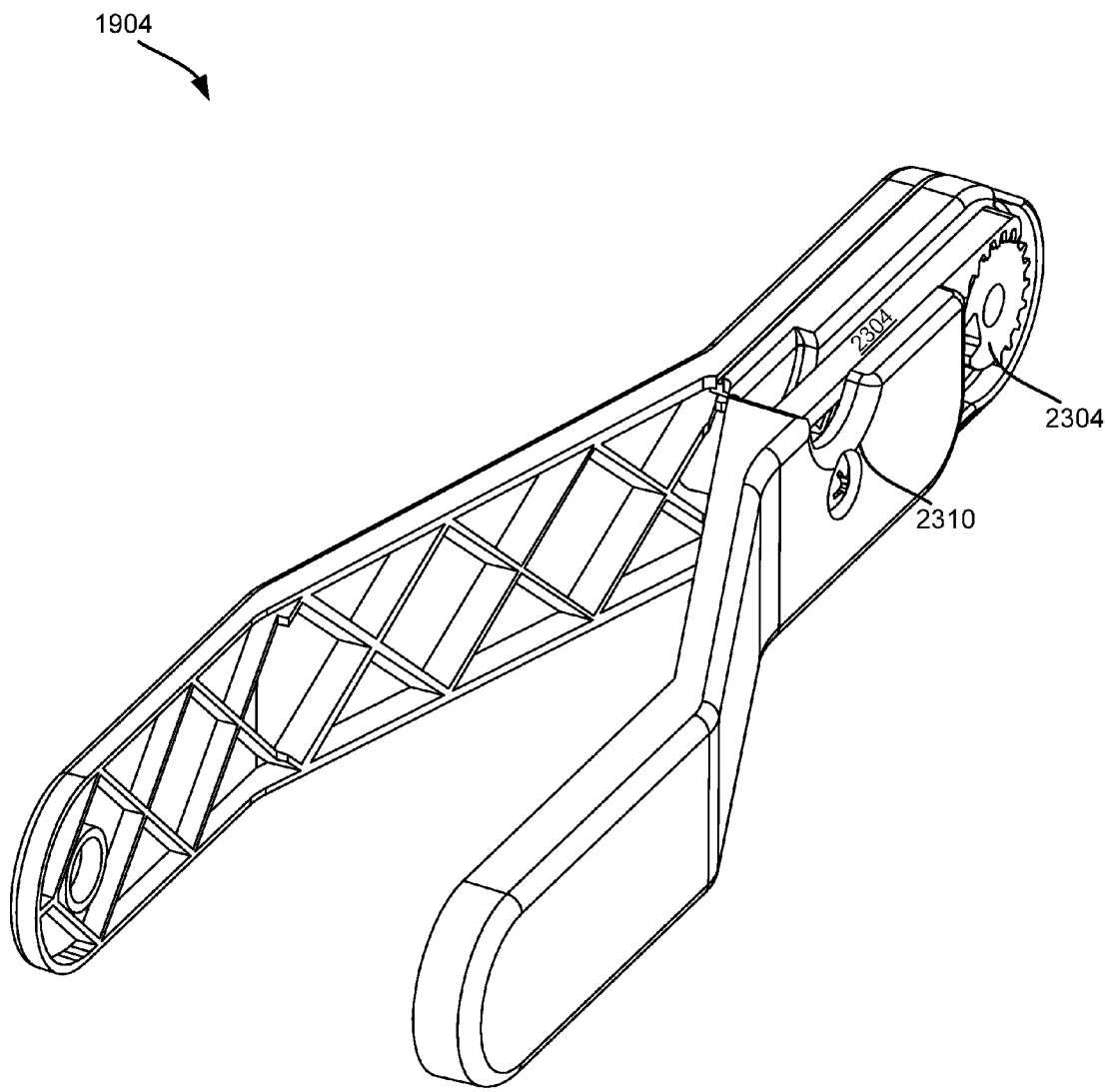
FIG. 23 is a perspective view diagram illustrating one embodiment of the projector arm in accordance with embodiments of the disclosure.

FIG. 23 is a perspective view diagram illustrating one embodiment of the projector arm 1904 in accordance with embodiments of the disclosure. In one embodiment, the projector arm 1904 is formed with a lockable and positionable coupling, as described above. In one embodiment, this coupling includes a gear 2302 and a locking arm 2304. The locking arm 2304, in one embodiment, include teeth at one end of the locking arm that are configured to engage the gear 2302 and prevent rotation of the projector arm 1904 with respect to the gear 2302 (or a pin coupled to the gear). The locking arm 2304 is pivotable and engaged by depressing an end of the locking arm 2304 that is opposite of the teeth. Depressing the other end of the locking arm 2304 lifts the teeth from engagement with the gear 2302 and allows the projector arm 1904 to move with respect to the gear 2302. A cutout 2310 may be formed in the projector arm 1904 to allow for the locking arm 2304 to be depressed.

Figure 24:
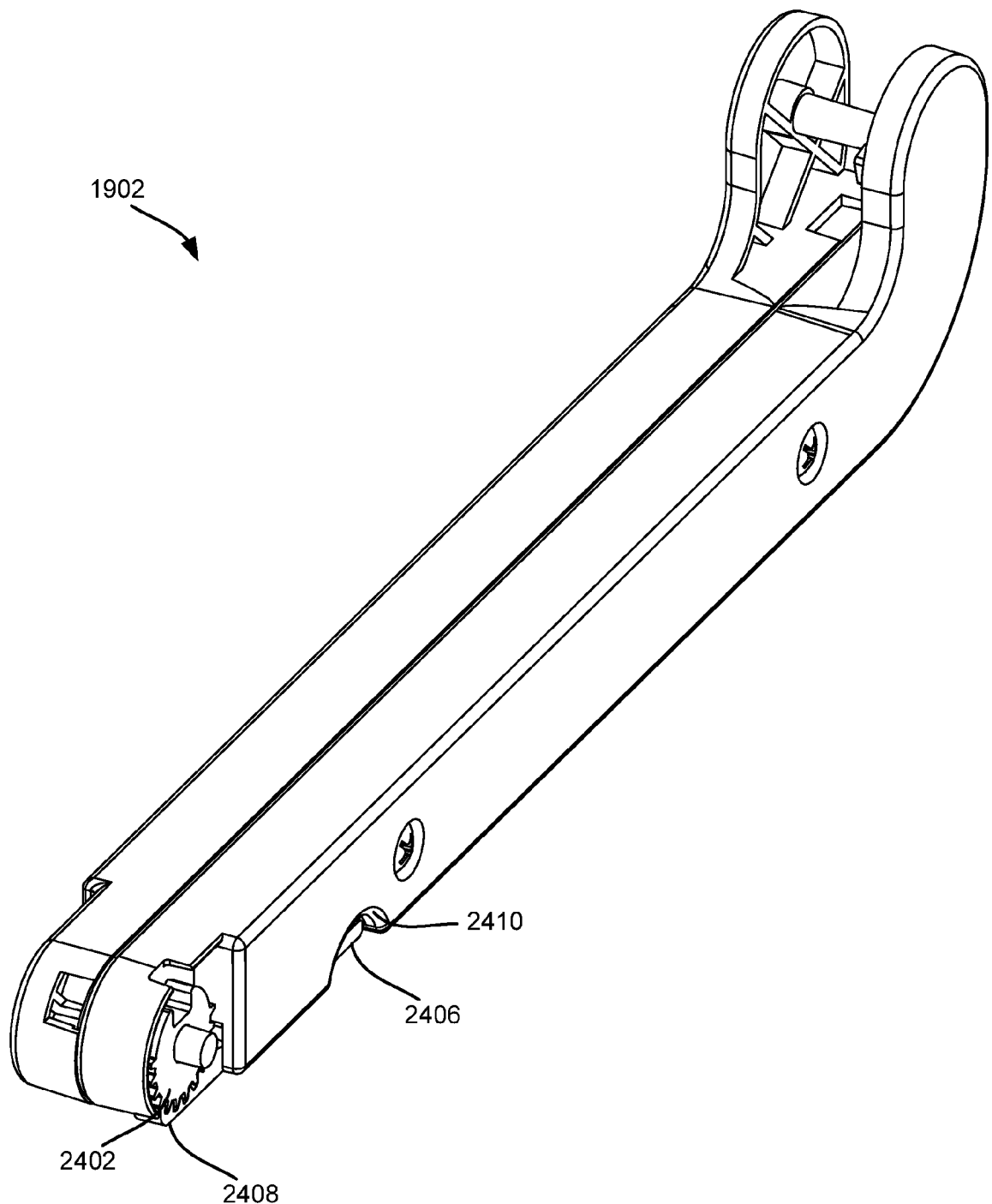
FIG. 24 is a perspective view diagram illustrating one embodiment of the intermediate arm in accordance with embodiments of the disclosure.

FIG. 24 is a perspective view diagram illustrating one embodiment of the intermediate arm 1902 in accordance with embodiments of the disclosure. In the depicted embodiment, the intermediate arm also includes a locking coupling as described above with reference to FIG. 23. The locking coupling includes a gear 2402 rotationally coupled with the intermediate arm 1902, and a locking member 2404. In a similar manner, the locking member 2404 of the intermediate arm 1902 is formed with teeth at one end that engage the gear 2402. The locking member 2404 (or locking arm) pivots so that when one end 2406 is depressed, the other end 2408 lifts and the teeth disengage from the gear 2402. A cutout 2410 may be formed in the intermediate arm 1902 to allow the locking member 2404 to be depressed.

Figure 25:
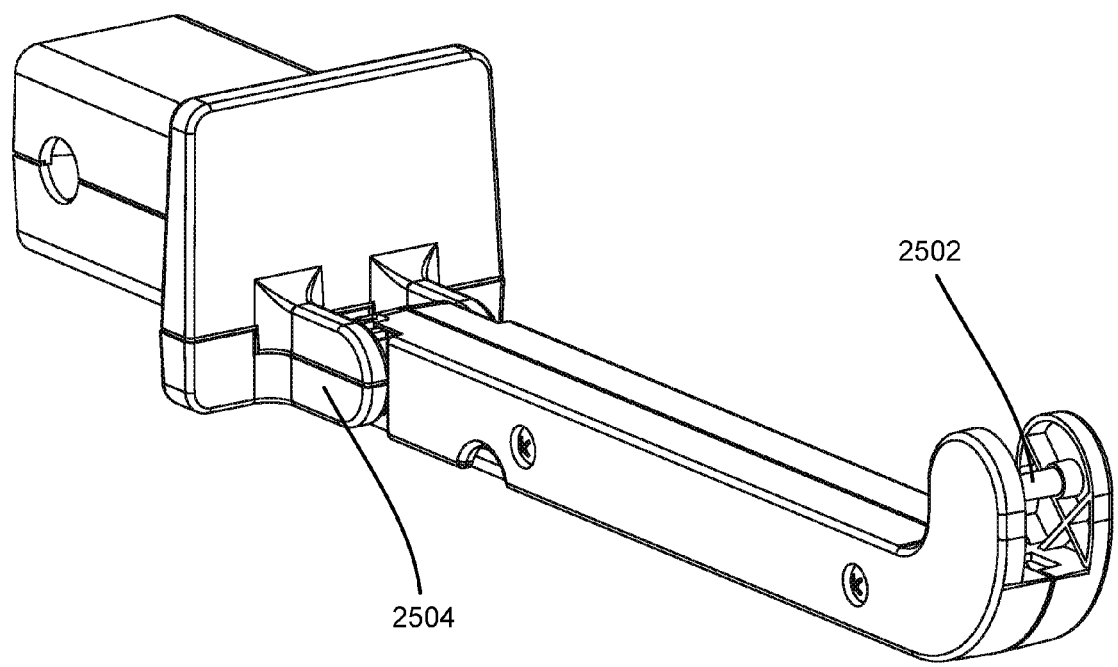
FIG. 25 is a perspective view diagram illustrating one embodiment of the bar mount 1906 and the intermediate arm in accordance with embodiments of the disclosure.

FIG. 25 is a perspective view diagram illustrating one embodiment of the bar mount 1906 and the intermediate arm 1902 in accordance with embodiments of the disclosure. In one embodiment, the intermediate arms 1902 include a pin or rod 2502 that engages the gear of the projector arm. The rod 2502, in one example, is coupled with the gear of the projector arm so that the gear does not rotate with reference to the rod. Stated differently, the rod 2502 and the gear of the projector arm, in one embodiment, move together. In a similar manner, a rod is disposed between the coupling arms 2504 of the bar mount 1906 to engage the gear of the intermediate arm.

Figure 26:
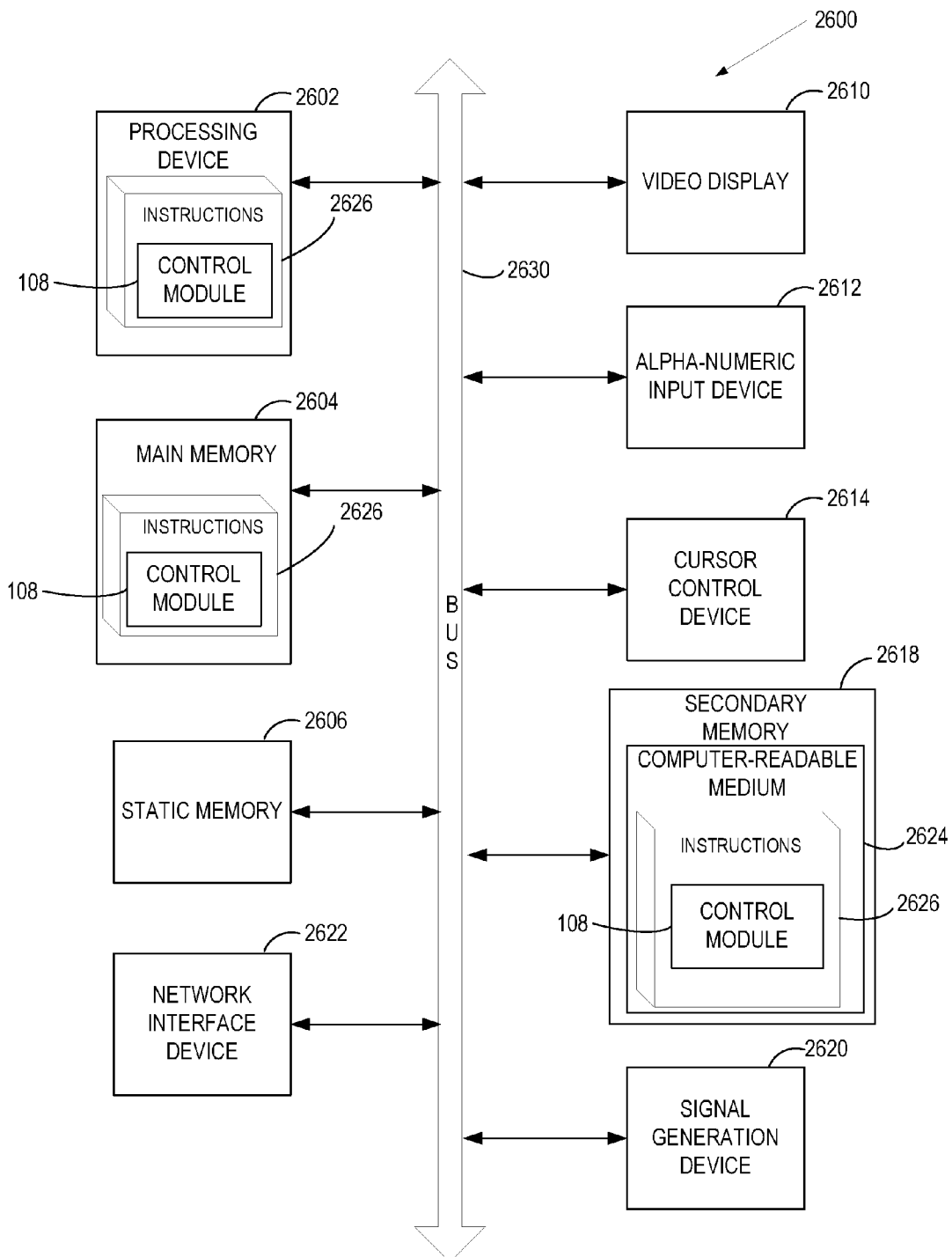
FIG. 26 illustrates a diagrammatic representation of a machine in the exemplary form of a computing system within which a set of instructions, for causing the machine to perform any one or more of the methodologies discussed herein, may be executed.

FIG. 26 illustrates a diagrammatic representation of a machine in the exemplary form of a computing system 2600 within which a set of instructions, for causing the machine to perform any one or more of the methodologies discussed herein, may be executed. Within the computer system 2600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine in a client-server network environment, or as a peer machine in a peer-to-peer (or distributed) network environment. The machine may be an embedded system, a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 2600 includes a processing device 2602, a main memory 2604 (e.g., read-only memory (ROM), flash memory, dynamic random access memory (DRAM) such as synchronous DRAM (SDRAM) or DRAM (RDRAM), etc.), a static memory 2606 (e.g., flash memory, static random access memory (SRAM), etc.), and a secondary memory 2618 (e.g., a data storage device in the form of a drive unit, which may include fixed or removable computer-readable storage medium), which communicate with each other via a bus 2630.

Processing device 2602 represents one or more general-purpose processing devices such as a microprocessor, central processing unit, or the like. More particularly, the processing device 2602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 2602 may also be one or more special-purpose processing devices such as an application specific integrated circuit (ASIC), a field programmable gate array (FPGA), a digital signal processor (DSP), network processor, or the like. Processing device 2602 is configured to execute the instructions 2626 for performing the operations and steps discussed herein.

The computer system 2600 may further include a network interface device 2622. The computer system 2600 also may include a video display unit 2610 (e.g., a liquid crystal display (LCD) or a cathode ray tube (CRT)) connected to the computer system through a graphics port and graphics chipset, an alphanumeric input device 2612 (e.g., a keyboard), a cursor control device 2614 (e.g., a mouse), and a signal generation device 2620 (e.g., a speaker).

The secondary memory 2618 may include a machine-readable storage medium (or more specifically a computer-readable storage medium) 2624 on which is stored one or more sets of instructions 2626 embodying any one or more of the methodologies or functions described herein. In one embodiment, the instructions 2626 include instructions for the control module 108 as described herein. The instructions 2626 may also reside, completely or at least partially, within the main memory 2604 and/or within the processing device 2602 during execution thereof by the computer system 2600, the main memory 2604 and the processing device 2602 also constituting machine-readable storage media.

The computer-readable storage medium 2624 may also be used to store the instructions 2626 persistently. While the computer-readable storage medium 2624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 2626, components and other features described herein can be implemented as discrete hardware components or integrated in the functionality of hardware components such as ASICS, FPGAs, DSPs or similar devices. In addition, the instructions 2626 can be implemented as firmware or functional circuitry within hardware devices. Further, the instructions 2626 can be implemented in any combination hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring," "identifying," "generating," "providing," "selecting," "obtaining," "receiving," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
    a mount bar for engaging a hitch receiver tube of a vehicle;
    an intermediate arm having a first end rotationally coupled with the mount bar, where the first end is lockable in a position with respect to the mount bar;
    a projector arm having a first end rotationally coupled with a second end of the intermediate arm, where the first end of the projector arm is lockable in a position with respect to the second end of the intermediate arm; and
    where the intermediate arm and the projector arm together form a conduit for an electrical connection between the projector and the vehicle.

2. The system of claim 1, further comprising a gear disposed between the first end of the intermediate arm and the mount bar, the gear rotationally coupled with one of the mount bar or the intermediate arm.

3. The system of claim 2, further comprising a locking arm comprising teeth configured for engaging the gear and locking the position of the intermediate arm with respect to the mount bar.

4. The system of claim 1, further comprising a gear disposed between the second end of the intermediate arm and the projector arm, the gear rotationally coupled with one of the second end of the intermediate arm or the projector arm.

5. The system of claim 4, further comprising a locking arm comprising teeth configured for engaging the gear and locking the position of the projector arm with respect to the second end of the intermediate arm.

6. The system of claim 1, where the projector arm comprises a second end configured for engaging protrusions of the projector to couple the projector to the second end of the projector arm.

7. The system of claim 1, further comprising a compressible collar disposed between the mount bar and the hitch receiver tube.

8. The system of claim 1, where the intermediate arm has a length greater than the projector arm.

9. The system of claim 1, where the projector arm is transitionable between a plurality of lockable positions that include an open position and a closed position.

10. The system of claim 9, where the projector arm collapses and engages the intermediate arm when in the closed position.

11. A device comprising:
    a mount bar for engaging a hitch receiver tube of a vehicle;
    a flexible arm coupled at a first end with the mount bar and extending outward from the mount bar, where the flexible arm comprises gooseneck tubing; and
    a projector mounting bracket coupled to a second end of the flexible arm, the projector mounting bracket configured to support a projector.

12. The device of claim 11, further comprising a compressible collar disposed between the mount bar and the hitch receiver tube.

13. The device of claim 11, wherein the flexible arm forms a conduit for an electrical connection between the projector and the vehicle.

14. The device of claim 11, where the length of the gooseneck tubing is in the range of between about 12 and 24 inches.

15. The device of claim 11, where the diameter of the gooseneck tubing is in the range of between about ¼ and 3 inches.

16. An apparatus comprising:
    a mount bar for engaging a hitch receiver tube of a vehicle;
    an intermediate arm having a first end rotationally coupled with the mount bar, where the first end is lockable in a position with respect to the mount bar;
    a projector arm having a first end rotationally coupled with a second end of the intermediate arm, where the first end of the projector arm is lockable in a position with respect to the second end of the intermediate arm, where the intermediate arm and the projector arm together form a conduit for an electrical connection between the projector and the vehicle; and
    where at least one of the intermediate arm or the projector arm is telescoping.

17. The apparatus of claim 16, further comprising a compressible collar disposed between the mount bar and the hitch receiver tube.

* * * * *